United States Patent [19]

Yamasaki et al.

[11] Patent Number: 5,710,857
[45] Date of Patent: Jan. 20, 1998

[54] EDIT SEAMING IN A VIDEO DATA RECORDING/REPRODUCING APPARATUS

[75] Inventors: Tatsuo Yamasaki; Junichi Nose, both of Nagaokakyo, Japan

[73] Assignee: Mitsubishi Denki Kabushiki Kaisha, Tokyo, Japan

[21] Appl. No.: 290,289

[22] Filed: Aug. 15, 1994

Related U.S. Application Data

[63] Continuation of Ser. No. 22,348, Feb. 24, 1993, abandoned.

[30] Foreign Application Priority Data

Feb. 28, 1992 [JP] Japan ................. 4-043073
Jun. 19, 1992 [JP] Japan ................. 4-161059

[51] Int. Cl.$^6$ ................. H04N 5/93; G11B 27/02
[52] U.S. Cl. ................. 386/52; 360/14.1; 386/53
[58] Field of Search ................. 358/335, 311, 358/313, 310, 342; 360/13, 14.1

[56] References Cited

U.S. PATENT DOCUMENTS

| | | | |
|---|---|---|---|
| 3,617,626 | 11/1971 | Blutch | 358/311 |
| 4,768,105 | 8/1988 | Aoki | 360/14.1 |
| 4,774,600 | 9/1988 | Baumeister | 360/14.1 |
| 5,032,927 | 7/1991 | Watanabe et al. | 358/335 |
| 5,068,744 | 11/1991 | Ito | 358/310 |

FOREIGN PATENT DOCUMENTS 1-177292  7/1989  Japan.

OTHER PUBLICATIONS

Nakayama et al, NHK Science and Technical Research Labs. ½" Composite Digital VTR format "D–3" (No Date).

*Primary Examiner*—Tommy P. Chin
*Assistant Examiner*—Robert Chevalier

[57] ABSTRACT

In recording one frame of video data in a plurality of tracks, high-frequency components of the video data are recorded in first and last ones of the plurality of tracks while low-frequency components thereof are recorded in the other tracks. In an editing/recording operation, a first frame of video data is recorded twice for first two consecutive frame periods after the start of the recording, and a last frame of video data is recorded twice for last two consecutive frame periods before the end of the recording. In a reproducing operation, one frame of video data is not used immediately before and after the start of the editing/recording operation and immediately before and after the end of the editing/recording operation.

37 Claims, 32 Drawing Sheets

Fig. 17(a) INPUT DIGITAL DATA ---- | FRAME J | FRAME K | FRAME L |

Fig. 17(b) OUTPUT OF ENCODER 2 ---- | FRAME J | FRAME K | FRAME L | FRAME LR=L |

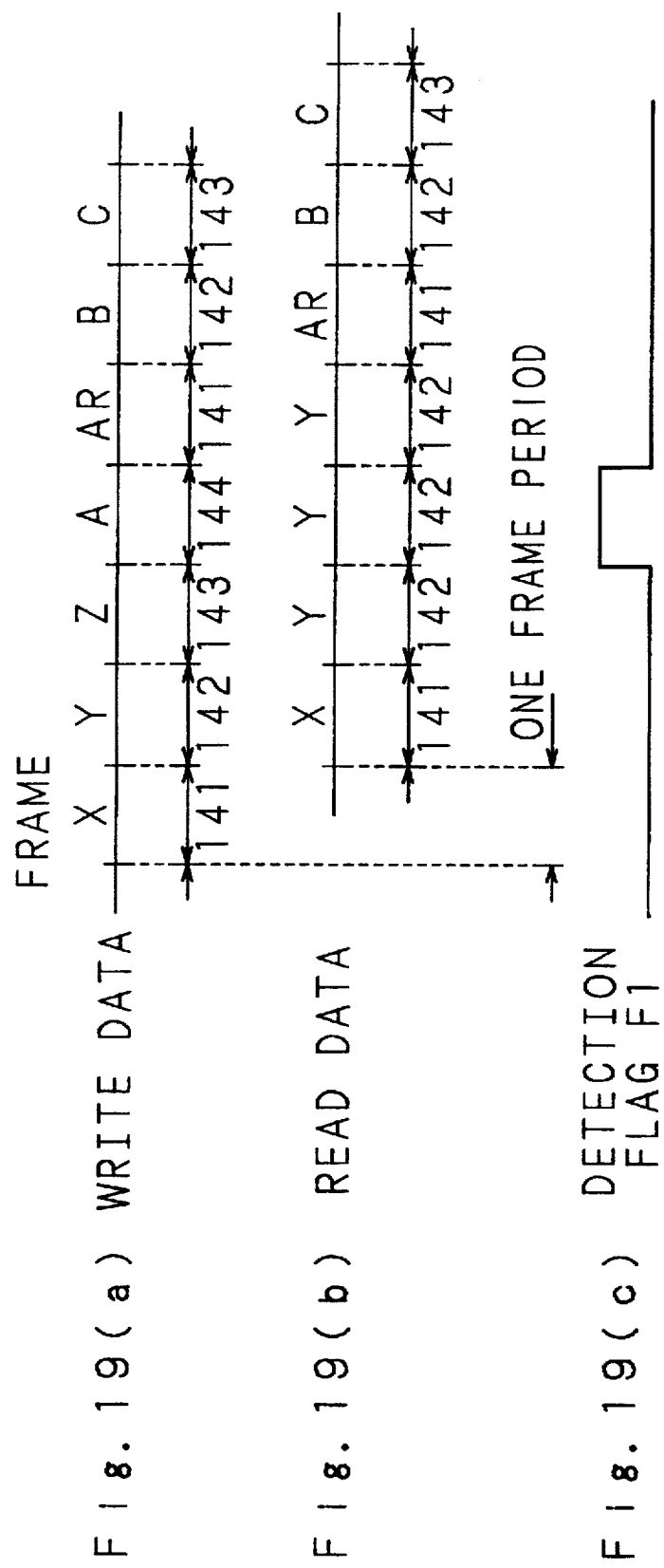

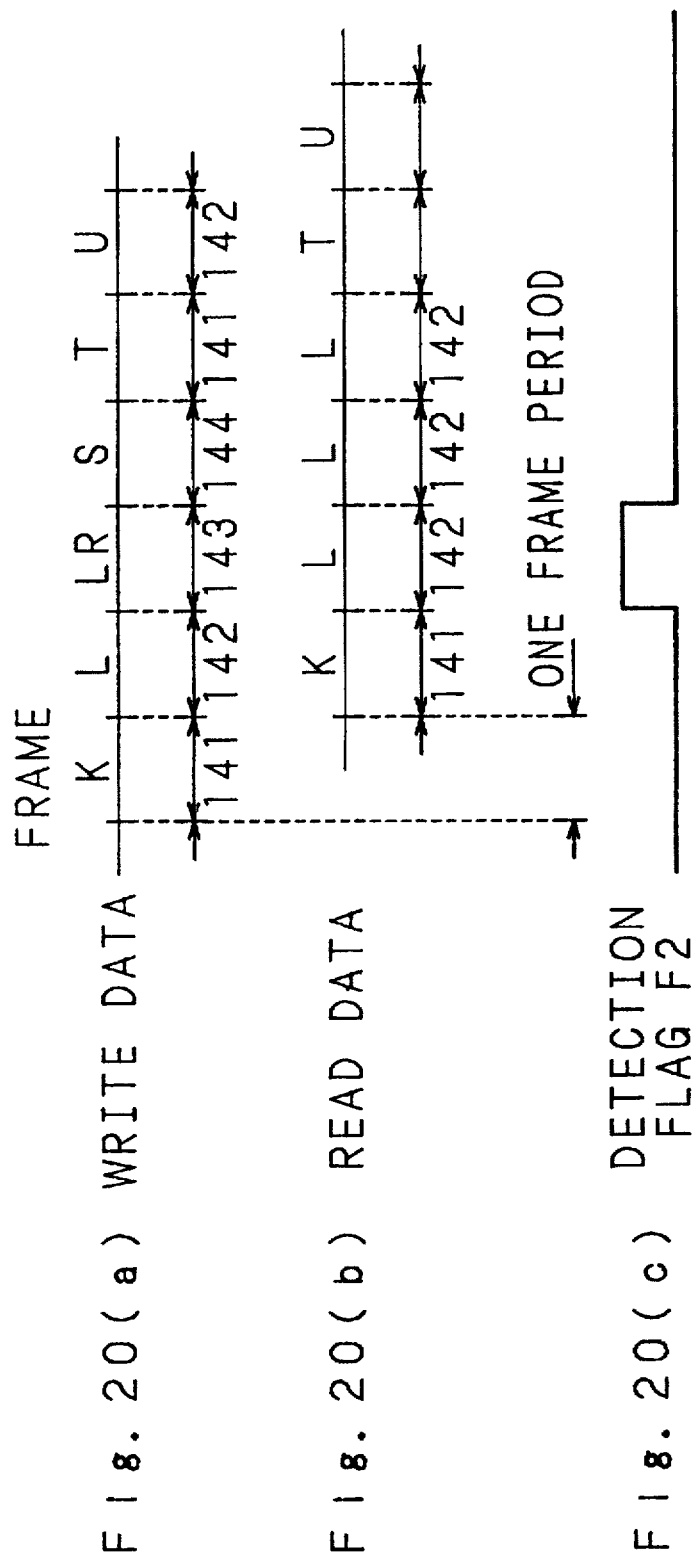

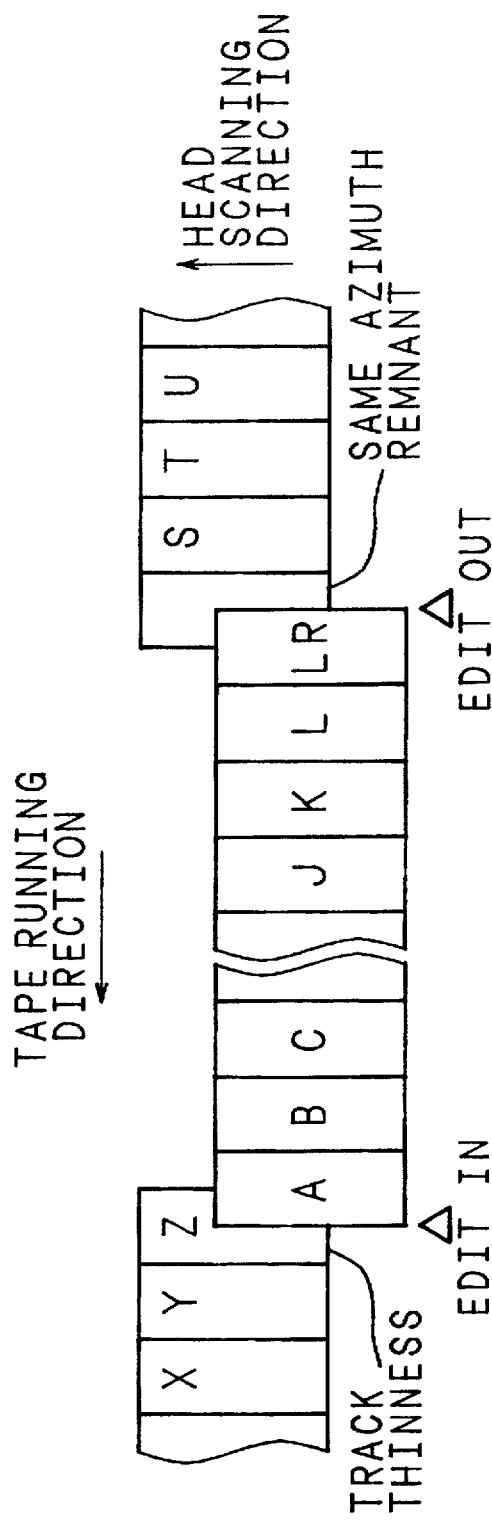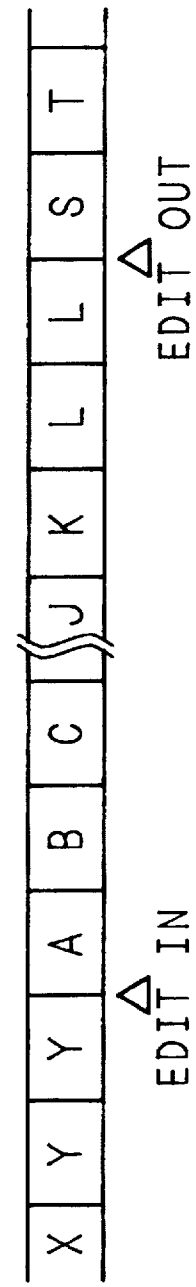

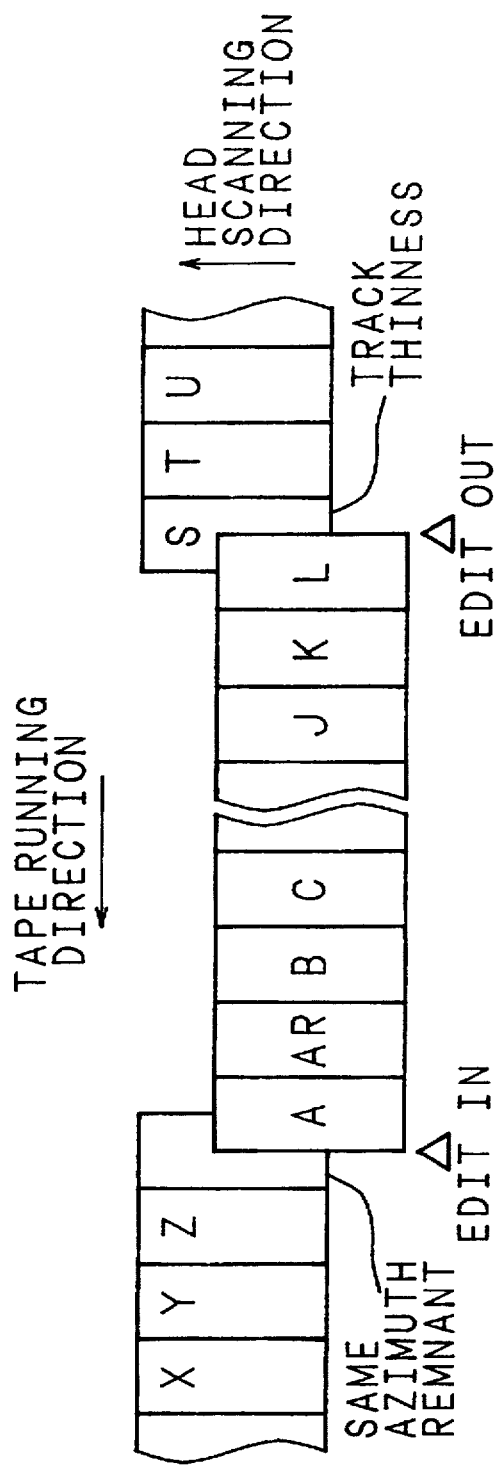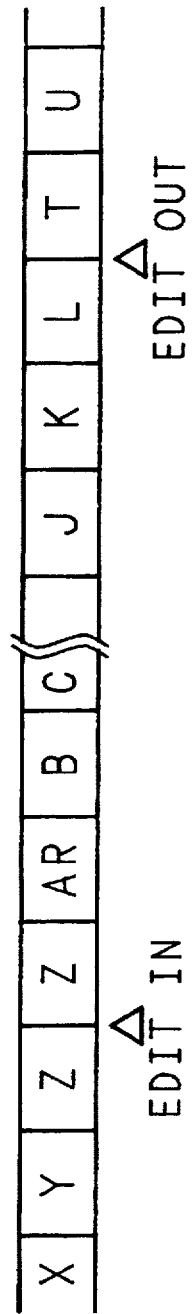
Fig. 23(a)
Fig. 23(b)

Fig. 25(a) INPUT DIGITAL DATA

| FRAME | FRAME | FRAME |
|---|---|---|
| A | B | C |

Fig. 25(b) OUTPUT OF ENCODER 2

| FRAME | FRAME | FRAME |
|---|---|---|
| A | B | C |

Fig.26(a) INPUT DIGITAL DATA ---- | FRAME J | FRAME K | FRAME L |

Fig.26(b) OUTPUT OF ENCODER 2 ---- | FRAME J | FRAME K | FRAME L |

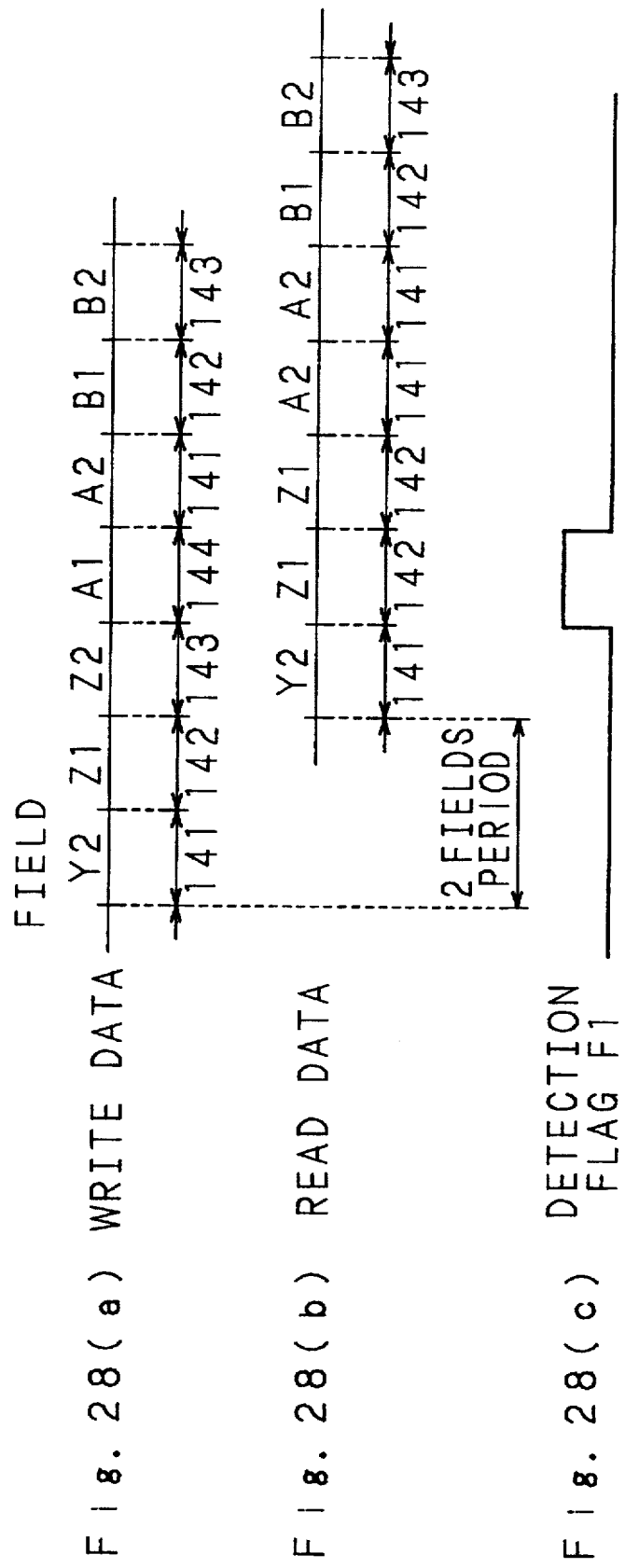

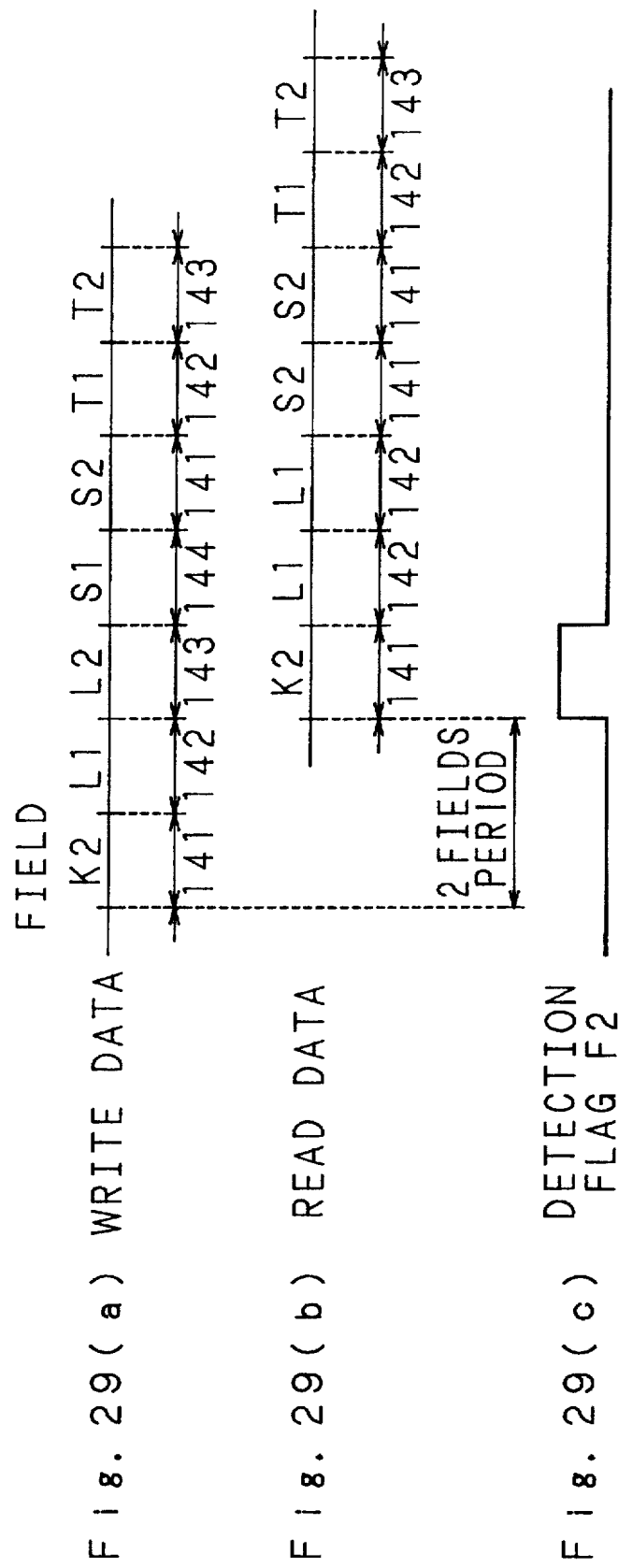

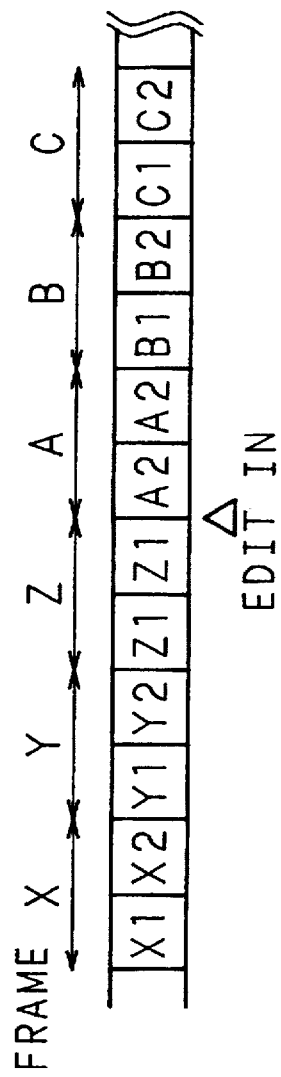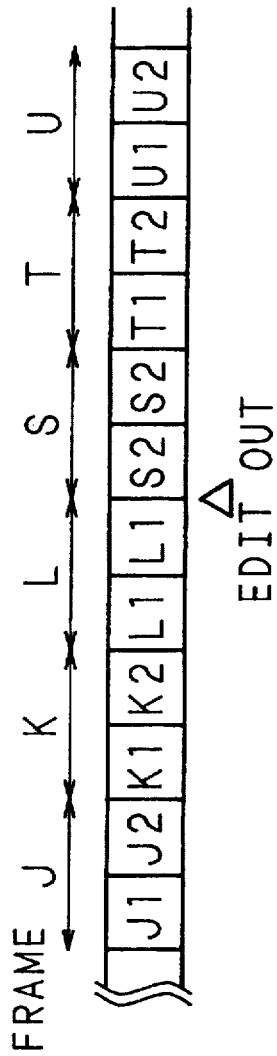

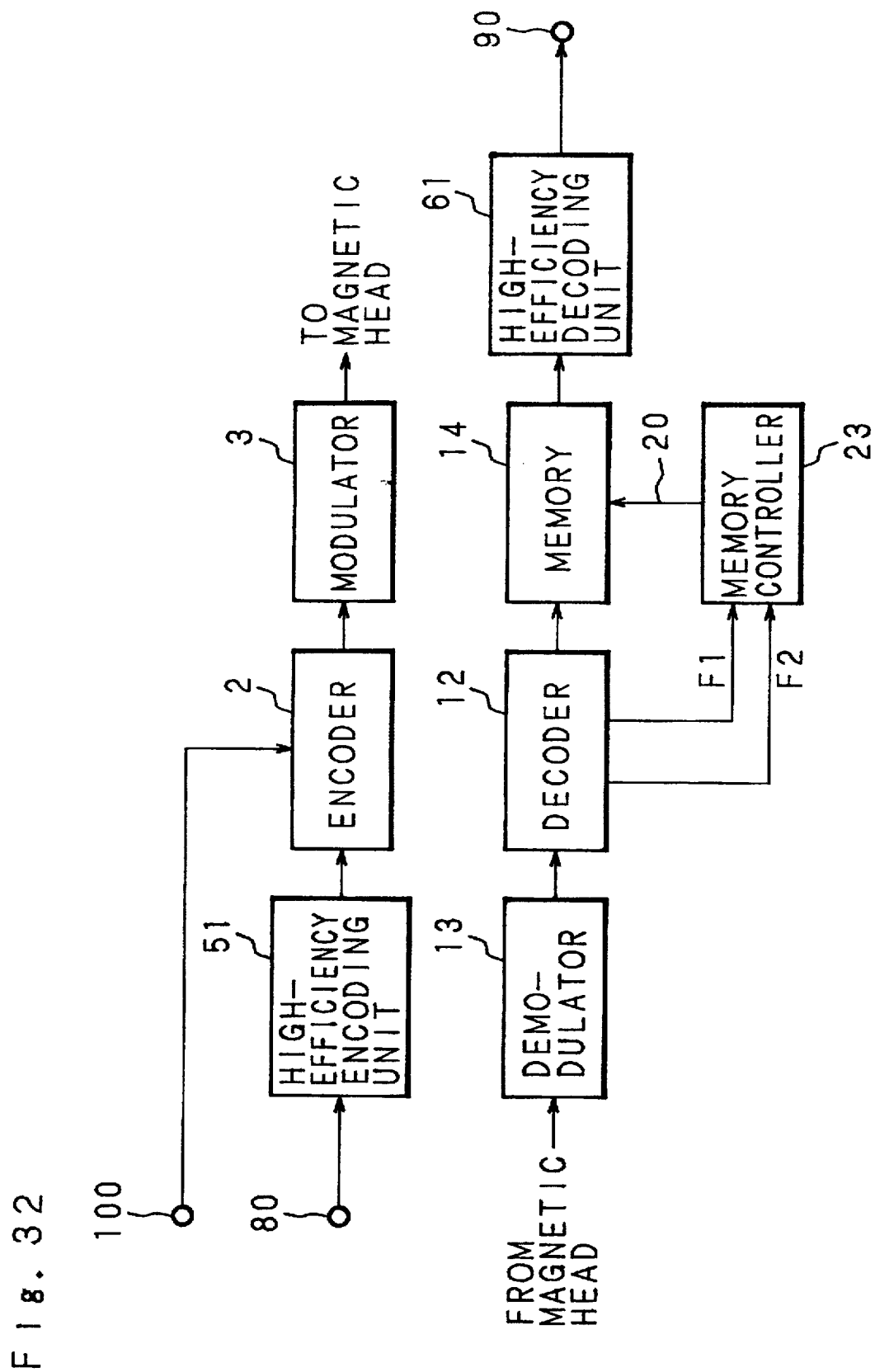

EDIT SEAMING IN A VIDEO DATA RECORDING/REPRODUCING APPARATUS

This application is a continuation of application Ser. No. 08/022,348 filed on Feb. 24, 1993, now abandoned.

BACKGROUND OF THE INVENTION

1. Field of the Invention

This invention relates to a video data recording/reproducing apparatus for reproducing a video data recorded on a magnetic tape in the form of a digital signal and, particularly to a signal processing executed during the recording and reproducing operations in consideration of an editing mode such as an assemble editing and an insert editing.

2. Description of Related Art

FIG. 1 shows a data processing system in a digital VTR for converting a video data into a digital signal, recording the digital signal helically on a magnetic tape by the use of rotary magnetic head, and reproducing the recorded signal. In an encoder 2, the video data for a predetermined period are divided into a plurality of blocks and each block is coded (addition of an error correction code and numbering to the respective blocks). The coded data are recorded on the tape helically through an unillustrated magnetic head after being digitally modulated in a modulator 3.

In a reproducing system, the reproduced signal from the magnetic head is digitally demodulated in a demodulator 13, and thus obtained reproduced digital code is input to a decoder 12. In the decoder 12, an error detection is applied to each block of the reproduced video data using a parity code which has been added to each block during the recording operation. An error is corrected if detected any. If an error is detected which cannot be corrected, the reproduced video data carrying no error is output after the restoration carried out, for example, by replacing a data of a pixel which could not be corrected with a data generated from correct pixels in the vicinity of the incorrect pixel.

Let us consider a case where an editing operation such as assemble editing or insert editing is carried out in the above VTR. At this time, control is executed such that a previously recorded track (old track) located immediately before newly inserted tracks and the first inserted track (new track) forms a continuous and aligned seam. Hereafter, this seam is referred to as an edit IN point. Further, a point where the recording of the last new track is completed in completing the insertion of tracks by the editing operation is referred to as an edit OUT point.

However, in reality, in the VTR of the guardband-less solid azimuth recording system, there occur, for example, two types of discontinuous states of the recording tracks as shown in FIG. 2 at the edit IN point due to a mount error or track width error of the recording head, an alignment error during the editing operation, and like errors. One discontinuous state is an occurrence of the track thinness as shown in FIG. 2(a) in which a part of a region of the old track located immediately before the edit IN point in the widthwise direction is overwritten and erased by the new track located immediately after the edit IN point. The other discontinuous state is, as shown in FIG. 2(b), an occurrence of remnant of the old track (same azimuth remnant) previously recorded immediately after the edit IN point. The above discontinuous states are described with respect to the edit IN point, but the same can be said with respect to the edit OUT point. In other words, in the case of the overwrite edit, a part of the old track previously recorded immediately before the edit OUT point shown in FIG. 2(a) remains to be erased (same azimuth remnant). Further, the track thinness occurs due to the fact that a part of a region of the old track located immediately after the edit OUT point shown in FIG. 2(b) in the widthwise direction is overwritten and erased by the new track located immediately before the edit OUT point.

When the track including the discontinuity which occurs before and after the edit IN point or edit OUT point is reproduced, the output level of the reproduced signal is reduced and the frequency of the error correction and restoration conducted in the decoder 12 is increased greatly. Accordingly, the reproduced digital video data output from the decoder 12 in FIG. 1 gives a reproduced video image which looks very unnatural. This phenomenon may occur more frequently if the recording tracks of the VTR are narrowed in order to realize longer time recordings.

SUMMARY OF THE INVENTION

An object of the invention is to provide a video data recording/reproducing apparatus which presents hardly any deterioration in the quality of a reproduced video image before and after edit IN and OUT points.

Another object of the invention is to provide a video data recording/reproducing apparatus which presents hardly any deterioration in the quality of a reproduced video image before and after edit IN and OUT points, not to mention during a normal reproducing operation.

In a first video data recording/reproducing apparatus, video data for a predetermined video area (one frame or field) is constituted as a plurality of tracks, and both or either one of first and last ones of the plurality of tracks consisting of the video data for the predetermined period are allotted as tracks for data including mainly high-frequency components in the video data for the predetermined period. In an editing mode such as an assemble editing and an insert editing, edit IN and OUT points are each formed by the unit of the video data for the predetermined period. In a reproducing operation, for a plurality of tracks constituting units of video data for the predetermined period other than units of the video data for the predetermined period including the tracks positioned immediately before and after the edit IN and OUT points, results of the error correction and restoration concerning reproduced signals from these tracks are used as they are. Likewise, for the tracks positioned immediately before and after the edit IN and OUT points where the track thinness or same azimuth remnant occurs, the results of the error correction and restoration concerning the reproduced signals from these tracks are used as they are.

According to the first video data recording/reproducing apparatus, the data including mainly the high-frequency components in the video data for the predetermined period is recorded in the tracks immediately before and after the edit IN or OUT point where the track thinness or same azimuth remnant occurs. Accordingly, if the error correction and restoration should occur in the reproduced signals from these tracks at an increased frequency, the reproduced video images hardly look deteriorated immediately before and after the edit IN and OUT points due to the fact that the results of the error correction and restoration concerning the reproduced signals from these tracks are used as they are.

In a second video data recording/reproducing apparatus, a video data for a predetermined video area (one frame or field) is constituted as a plurality of tracks, and both or either one of first and last ones of the plurality of tracks consisting of the video data for the predetermined period are allotted as tracks for data including mainly high-frequency components in the video data for the predetermined period. In an editing mode such as an assemble editing and an insert editing, edit IN and OUT points are each formed by the unit of the video data for the predetermined period. In a reproducing operation, for a plurality of tracks constituting units of video data for the predetermined period other than units of the video data for the predetermined period including at least the tracks positioned immediately before and after the edit IN and OUT points, results of the error correction and restoration concerning reproduced signals from these tracks are used as they are. Only for the tracks positioned immediately before and after the edit IN and OUT points where the track thinness or same azimuth remnant occurs, the error occurring frequency in the reproduced signal from each of these tracks is compared with a predetermined threshold value. If the error occurring frequency is in excess of the threshold value, the results of the error correction and restoration concerning the reproduced signal from this track are not used. If the error occurring frequency is smaller than the threshold value, the results of the error correction and restoration concerning the reproduced signal from this track are used.

According to the second video data recording/reproducing apparatus, the data including mainly the high-frequency components in the video data for the predetermined period is recorded in the tracks immediately before and after the edit IN or OUT point where the track thinness or same azimuth remnant occurs. Accordingly, even if it is determined according to the error occurring frequency in the tracks positioned immediately before and after the edit IN or OUT point where the track thinness or same azimuth remnant occurs that the results of the error correction and restoration concerning the reproduced signals from these tracks are not used, the reproduced video images hardly look deteriorated immediately before and after the edit IN and OUT points.

In a third video data recording/reproducing apparatus, in a recording operation such as assemble editing or insert editing, the recording is carried out by the frame of video data. A first frame of video data is recorded twice in a row only for first two consecutive frame periods immediately after the edit IN point. At the end of the recording, a last frame of video data is recorded twice in a row only for last two consecutive frame periods immediately before the edit OUT point. The edit IN and OUT points are each formed by the frame of video data. In a reproducing operation, for the tracks constituting units of the video data for the predetermined period which are recorded continuously at regions other than those immediately before and after the edit IN and OUT points, the results of the error correction and restoration concerning reproduced signals from these tracks are used as reproduced video data. However, for regions immediately before and after the edit IN and OUT points where the track thinness or same azimuth remnant occurs, the video data for the last predetermined period in the old tracks which are previously recorded immediately before the edit IN point and the video data for a first predetermined period which is newly recorded immediately after the edit IN point are not used as reproduced video data. The similar reproducing operation is carried out at regions immediately before and after the edit OUT point.

According to the third video data recording/reproducing apparatus, even if many errors occur in the reproduced signals from the tracks immediately before and after the edit IN and OUT points resulting from the track thinness or some azimuth remnant and thereby the error correction and restoration are conducted at an increased frequency, the results of the error correction and restoration concerning the units of the video data for the predetermined period corresponding to these tracks are not used as reproduced video data. Thus, the reproduced video images do not look deteriorated immediately before and after the edit IN and OUT points.

In a fourth video data recording/reproducing apparatus, in a recording operation such as assemble editing or insert editing, the recording is carried out by the frame of video data. A last frame of video data is recorded twice in a row only for last two consecutive frame periods immediately before the edit OUT point. The edit IN and OUT points are each formed by the frame of video data. In a reproducing operation, for the tracks constituting units of the video data for the predetermined period which are recorded continuously at regions other than those immediately before and after the edit IN and OUT points, the results of the error correction and restoration concerning reproduced signals from these tracks are used as reproduced video data. However, the video data for the last predetermined period in the old tracks which are previously recorded immediately before the edit IN point and the video data for a last predetermined period whose recording is completed immediately before the edit OUT point are not used as reproduced video data respectively in the vicinity of the edit IN point where the track thinness occurs and the edit OUT point where the same azimuth remnant occurs.

According to the fourth video data recording/reproducing apparatus, the reproduced video images do not look deteriorated immediately before and after the edit. IN and OUT points since the results of the error correction and restoration concerning the units of video data for the predetermined period corresponding to the last track immediately before the edit IN point where the track thinness occurs and the last track immediately before the edit OUT point where the same azimuth remnant occurs are not used as reproduced video data. Further, only the video data for the last predetermined period which is previously recorded immediately before the edit IN point is missing as a reproduced video image.

In a fifth video data recording/reproducing apparatus, in a recording operation such as assemble editing or insert editing, the recording is carried out by the frame of video data. A first frame of video data is recorded twice in a row only for first two consecutive frame periods immediately after the edit IN point. The edit IN and OUT points are each formed by the frame of video data. In a reproducing operation, for the tracks constituting units of the video data for the predetermined period which are recorded continuously at regions other than those immediately before and after the edit IN and OUT points, the results of the error correction and restoration concerning reproduced signals from these tracks are used as reproduced video data. However, the video data for a first predetermined period in newly recorded tracks immediately after the edit IN point and the video data for a first predetermined period in the old tracks which are previously recorded immediately after the edit OUT point are not used as reproduced video data respectively in the vicinity of the edit IN point where the same azimuth remnant occurs and the edit OUT point where the track thinness occurs.

According to the fifth video data recording/reproducing apparatus, the reproduced video images do not look deteriorated immediately before and after the edit IN and OUT points since the results of the error correction and restoration concerning the units of video data for the predetermined period corresponding to the first track immediately after the edit IN point where the same azimuth remnant occurs and the first track immediately after the edit OUT point where the track thinness occurs are not used as reproduced video data. Further, only the video data for the first predetermined period which is previously recorded immediately after the edit OUT point is missing as a reproduced video image.

In a sixth video data recording/reproducing apparatus, in a recording operation such as assemble editing or insert editing, the recording is carried out by the frame of video data whose first and second fields consist of at least one track each. The edit IN and OUT points are each formed by the frame of video data. In a reproducing operation, for tracks constituting frames of video data which are recorded continuously at regions other than those immediately before and after the edit IN and OUT points, the results of the error correction and restoration concerning reproduced signals from these tracks are used as reproduced video data. However, the video data of either one of the first and second fields in one frame corresponding to a last track which is previously recorded immediately before the edit IN point where the track thinness or same azimuth remnant occurs is not used as a reproduced video data. As a substitute for this data the same reproduced video data is used video data of the other field corresponding to a track before the last track. Further, the video data of either one of the first and second fields in one frame corresponding to a first track immediately after the edit IN point is not used as reproduced video data. As a substitute for this data the same reproduced video data is used as video data of the other field corresponding to a track after the first track. Likewise, the video data of either one of the first and second fields in one frame corresponding to a last track whose recording is completed immediately before the edit OUT point where the track thinness or same azimuth remnant occurs is not used as a reproduced video data. As a substitute for this data the same reproduced video data is used as video data of the other field corresponding to a track before the last track. Further, the video data of either one of the first and second fields in one frame corresponding to a first track which is previously recorded immediately after the edit OUT point is not used as a reproduced video data. As a substitute for this data the same reproduced video data is used as a video data of the other field corresponding to a track after the first track.

According to the sixth video data recording/reproducing apparatus, the reproduced video data of either one of the fields of the last frame which is previously recorded immediately before the edit IN point is allotted as the reproduced video data of both the first and second fields of this last frame. The reproduced video data of either one of the fields of the first frame immediately after the edit IN point is allotted as the reproduced video data of both the first and second fields of this first frame. Further, the reproduced video data of either one of the fields of the last frame whose recording is completed immediately before the edit OUT point is allotted as the reproduced video data of both the first and second fields of this last frame. The reproduced video data of either one of the fields of the first frame which is previously recorded immediately after the edit OUT point is allotted as the reproduced video data of both the first and second fields of this first frame. Thus, the reproduced video images do not look deteriorated immediately before and after the edit IN and OUT points, and no reproduced video image is missing one frame entirely.

In a seventh video data recording/reproducing apparatus, in a recording operation such as an assemble editing or insert editing, the recording is carried out by the frame of video data whose first and second fields consist of at least one track each. The edit IN and OUT points are each formed by the frame of video data. In a reproducing operation, for tracks constituting frames of video data which are recorded continuously at regions other than those immediately before and after the edit IN and OUT points, the results of the error correction and restoration concerning reproduced signals from these tracks are used as reproduced video data. However, the video data of either one of the first and second fields in one frame corresponding to a last track which is previously recorded immediately before the edit IN point where the track thinness or same azimuth remnant occurs is not used as a reproduced video data. As a substitute for this data the same reproduced video data as a video data of the other field corresponding to a track is used before the last track. Further, the video data of either one of the first and second fields in one frame corresponding to a first track immediately after the edit IN point is not used as a reproduced video data. As a substitute for this data the same reproduced video data is used as a video data of the other field immediately after the edit IN point. Likewise, the video data of either one of the first and second fields in one frame corresponding to a last track whose recording is completed immediately before the edit OUT point where the track thinness or same azimuth remnant occurs is not used as a reproduced video data. As a substitute for this data the same reproduced video data is used as a video data of the other field corresponding to a track before the last track. Further, the video data of either one of the first and second fields in one frame corresponding to a first track which is previously recorded immediately after the edit OUT point is not used as a reproduced video data. As a substitute for this data the same reproduced video data is used as a video data of the other field immediately before the edit OUT point.

According to the seventh video data recording/reproducing apparatus, the reproduced video data of either one of the fields of the last frame which is previously recorded immediately before the edit IN point is allotted as the reproduced video data of both the first and second fields of this last frame. As the reproduced video data of the first frame immediately after the edit IN point, for example, the reproduced video data of either one of the fields of the last frame which is previously recorded immediately before the edit IN point is allotted in the first field, and the reproduced video image of either one of the fields of the first frame immediately after the edit IN point is allotted in the second field. Further, the reproduced video data of either one of the fields of the last frame whose recording is completed immediately before the edit OUT point is allotted as the reproduced video data of both the first and second fields of this last frame. As the reproduced video data of the first frame immediately after the edit OUT point, for example, the reproduced video data of either one of the fields of the last frame whose recording is completed immediately before the edit OUT point is allotted in the first field, and the reproduced video image of either one of the fields of the first frame which is previously recorded immediately after the edit OUT point is allotted in the second field. Thus, the reproduced video images do not look deteriorated immediately before and after the edit IN and OUT points, and no reproduced video image is missing one frame entirely.

The above and further objects and features of the invention will be more fully be apparent from the following detailed description with accompanying drawings.

BRIEF DESCRIPTION OF THE DRAWINGS

FIG. 17(a) is a diagram for explaining recorded frames in the vicinity of the edit OUT point in the invention;

FIG. 17(b) is a diagram fop explaining recorded frames in the vicinity of the edit OUT point in the invention;

FIG. 19(a) is a diagram for explaining writing and reading timings in the vicinity of the edit IN point in the memory of the reproducing system in the invention;

FIG. 19(b) is a diagram for explaining writing and reading timings in the vicinity of the edit IN point in the memory of the reproducing system in the invention;

FIG. 19(c) is a diagram for explaining writing and reading timings in the vicinity of the edit IN point in the memory of the reproducing system in the invention;

FIG. 20(a) is a diagram for explaining writing and reading timings in the vicinity of the edit OUT point in the memory of the reproducing system in the invention;

FIG. 20(b) is a diagram for explaining writing and reading timings in the vicinity of the edit OUT point in the memory of the reproducing system in the invention;

FIG. 20(c) is a diagram for explaining writing and reading timings in the vicinity of the edit OUT point in the memory of the reproducing system in the invention;

FIG. 22(a) is a diagram showing a state of the recording tracks in the vicinity of the edit IN and OUT points by the frame in the invention;

FIG. 22(b) is a diagram showing a reproduced video data in the vicinity of the edit IN and OUT points by the frame in the invention;

FIG. 23(a) is a diagram showing a state of the recording tracks in the vicinity of the edit IN and OUT points by the frame in the invention;

FIG. 23(b) is a diagram showing a reproduced video data in the vicinity of the edit IN and OUT points by the frame in the invention;

FIG. 25(a) is a diagram for explaining recorded frames in the vicinity of the edit IN point in the invention;

FIG. 25(b) is a diagram for explaining recorded frames in the vicinity of the edit IN point in the invention;

FIG. 26(a) is a diagram for explaining recorded frames in the vicinity of the edit OUT point in the invention;

FIG. 26(b) is a diagram for explaining recorded frames in the vicinity of the edit OUT point in the invention;

FIG. 28(a) is a diagram for explaining writing and reading timings in the vicinity of the edit IN point in the memory of the reproducing system in the invention;

FIG. 28(b) is a diagram for explaining writing and reading timings in the vicinity of the edit IN point in the memory of the reproducing system in the invention;

FIG. 28(c) is a diagram fop explaining writing and reading timings in the vicinity of the edit IN point in the memory of the reproducing system in the invention;

FIG. 29(a) is a diagram for explaining writing and reading timings in the vicinity of the edit OUT point in the memory of the reproducing system in the invention;

FIG. 29(b) is a diagram for explaining writing and reading timings in the vicinity of the edit OUT point in the memory of the reproducing system in the invention;

FIG. 29(c) is a diagram for explaining writing and reading timings in the vicinity of the edit OUT point in the memory of the reproducing system in the invention;

FIG. 30(a) is a diagram showing a reproduced video data in the vicinity of the edit IN point by the frame in the invention;

FIG. 30(b) is a diagram showing a reproduced video data in the vicinity of the edit OUT point by the frame in the invention;

FIG. 32 is a block construction diagram of further another video data recording/reproducing apparatus according to the invention.

DESCRIPTION OF THE PREFERRED EMBODIMENTS

Hereafter, the invention will be described in detail with reference to the accompanying drawings showing embodiments thereof.

EMBODIMENT 1

Figure 3:
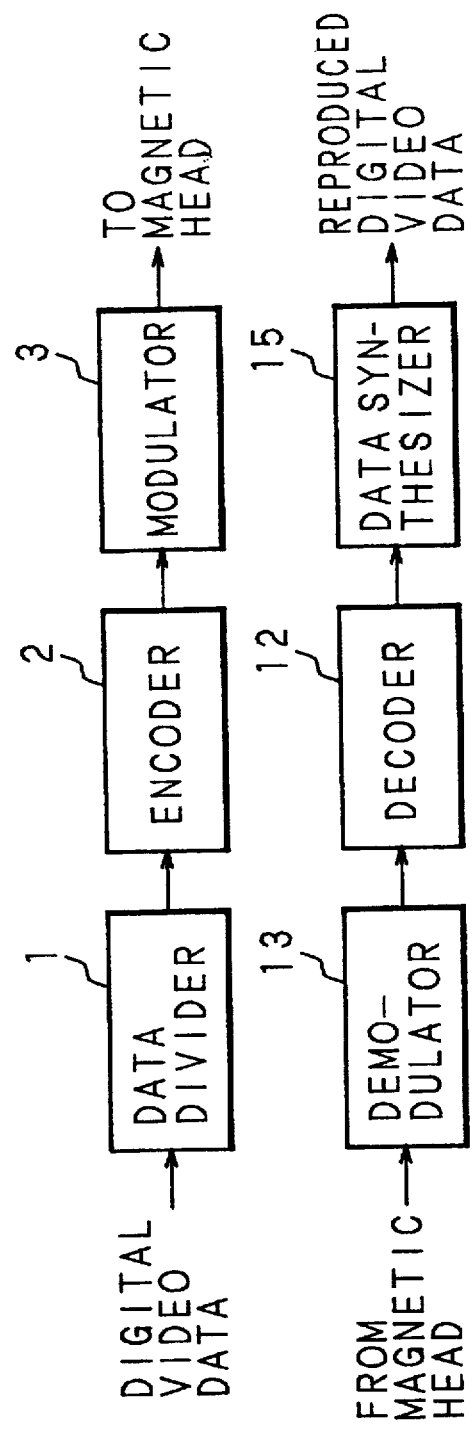
FIG. 3 is a block construction diagram of a video data recording/reproducing apparatus according to the invention.

FIG. 3 is a block diagram showing a principal construction of data processing system of a digital VTR according to the invention. In the recording processing system of FIG. 3, indicated at 1 is a data divider to which a digital data concerning a video data to be recorded is input, at 2 an encoder, and at 3 a modulator. In the reproducing processing system of FIG. 3, indicated at 13 is a demodulator, at 12 a decoder including an error detecting/correcting circuit, and at 15 a data synthesizer which operates in a manner reverse of the data divider 1.

Figure 4:
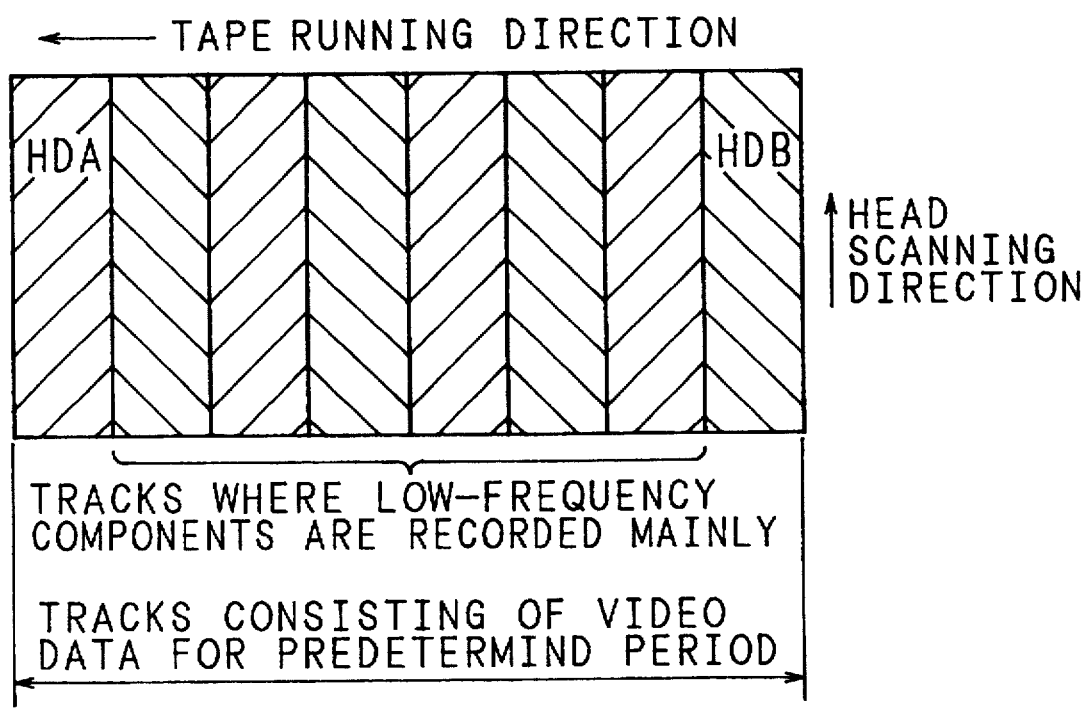
FIG. 4 is a diagram showing a plurality of recording tracks constituting one frame of video data in the invention.

Operations carried out at the time of recording will be described with reference to FIGS. 3 and 4. FIG. 4 illustrates a state of track pattern formed when one frame of video data is recorded on a magnetic tape in this embodiment. In FIG. 4, one frame of video data is recorded dividingly over eight tracks as an example. More specifically, as already known, video data of one picture (field) generally consists of relatively low-frequency components accounting for a large proportion of the data in the one picture and high-frequency components accounting for a smaller proportion of the data compared to the low-frequency components. In consideration of the current TV system, one frame consists of two fields (pictures). In FIG. 4, the high-frequency components (high definition data) HDA and HDB of the first and second fields carrying a small amount of data are allotted respectively to the first and last tracks of the eight tracks. The low-frequency components of the respective fields carrying a large amount of data are allotted in the six tracks held between the first and last tracks. There are known multichannel recording, multisegment recording, and multichannel multisegment recording as a system of recording a picture of video data dividingly over a plurality of tracks. According to the above recording system, the number of the tracks is not limited provided that three or more recording tracks are provided to record one frame of video data in this embodiment as well.

Figure 5:
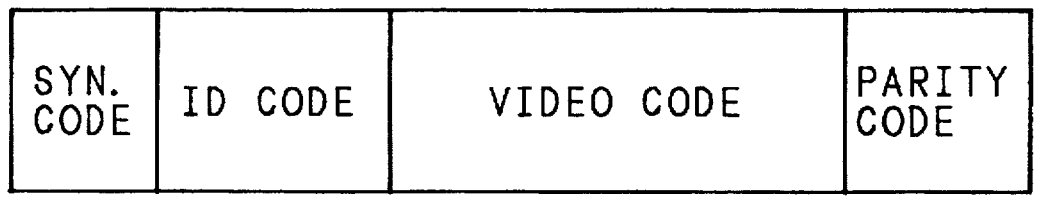
FIG. 5 is a diagram showing a data construction for each block on the respective recording tracks in the invention.

In FIG. 3, in the data divider 1 to which the digital data concerning the video data is input, each picture of video data constituting one frame is divided into the high-frequency components and low-frequency components, and the divided high-and-low-frequency components are aligned in the order of tracks shown in FIG. 4. In the encoder 2, each frame of divided data from the data divider 1 corresponding to the respective tracks is further divided into blocks, and the coding is carried out by adding to each block of data a parity code used to detect and correct an error in a video code in a reproducing operation together with a synchronizing code or ID code. This coded data is recorded helically on the magnetic tape through an unillustrated recording head after being digitally modulated in the modulator 3. FIG. 5 illustrates one block in a helical track recorded on the magnetic tape. A plurality of blocks each consisting of the synchronizing code, ID code, video code, and parity code are recorded continuously on the helical track.

Figure 6:
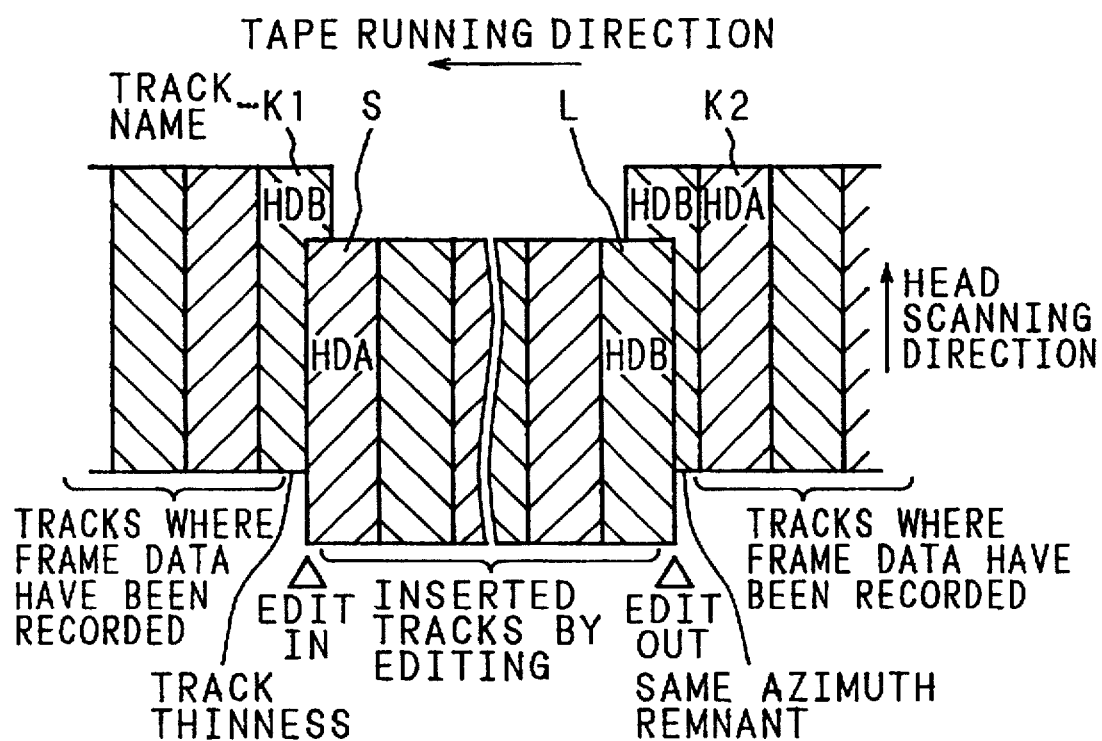
FIG. 6 is a diagram showing a state of the recording tracks during an editing operation in the invention.

FIG. 6 shows a state of the recording tracks when the assemble editing or insert editing are carried out in the VTR as described above. FIG. 6 shows an occurrence of track thinness in which a part of a previously recorded old track positioned immediately before an edit IN point, i.e. the last track K1 of the eight tracks corresponding to one picture of video data, is overwritten by a new track (track S) immediately after the edit IN point. Further, at an edit OUT point, a previously recorded old track positioned immediately therebefore remains to be erased (same azimuth remnant).

There will be next described operations carried out in the reproducing operation. To the decoder 12 are input the reproduced digital codes from the respective tracks obtained by demodulating digitally the reproduced signals from the magnetic head in the demodulator 13. In the decoder 12, the error detection is applied to each block of the reproduced data using the parity code added to each block in the encoder 2 in the recording operation. Any error is corrected if detected. If an error is detected which cannot be corrected, the restoration is carried out, for example, by replacing with a data synthesized from correct pixels in the vicinity of a pixel which could not be corrected, so that the video data carrying no error is input to the data synthesizer 15. In the data synthesizer 15, the operations are in the reverse order from those carried out in the data divider 1, with the result that the digital video data corresponding to the original one frame of video data is output therefrom.

At this time, in the case where the aforementioned edit IN and OUT points as shown in FIG. 6 are included, the track thinness occurs at the track K1 immediately before the edit IN point during the reproducing operation. Accordingly, the level of the reproduced output from the track K1 is reduced, thereby increasing the probability that many errors occur in the reproduced digital code. Although a track S positioned immediately after the edit IN point is formed to have a normal track width in a recording state shown in FIG. 6, the tracking may be disordered at the seam of the edit IN point depending upon the accuracy of tracking control during the reproducing operation. Thus, the track S is influenced from the off-track, and many errors occur in the reproduced digital code from the track S similar to the case of the track K1, thereby increasing the probability that the error detection and restoration are carried out in the decoder 12 at an increased frequency.

However, the data recorded in the tracks K1 and S are high-frequency components in one picture of video data, i.e. the high definition data HDB and HDA generally including a small amount of data in one picture of video data. Thus, even if the error correction and restoration for the reproduced signals from these tracks are carried out at an increased frequency, a viewer will hardly sense the deterioration in the quality of the reproduced video image at regions immediately before and after the edit IN point such as an unnaturally appearing video image.

An area in the vicinity of the edit OUT point in FIG. 6 is reproduced similar to the case where the area in the vicinity of the edit IN point is reproduced. In the last track (track L) of the last inserted picture of video data positioned immediately before the edit OUT point, the high definition data HDB is recorded. In the first track (track K2) of the previously recorded one picture of video data positioned immediately after the edit OUT point, the high definition data HDA is recorded. Thus, similar to the case of the edit IN point, the viewer will hardly sense the deterioration in the quality of the reproduced video image at regions immediately before and after the edit OUT point such as an unnaturally appearing video image.

As seen from the above, the high definition data including generally a small amount of data in one picture of video data is recorded in the tracks immediately before and after the edit IN and OUT points where the track thinness and the same azimuth occur. Accordingly, if the error correction and restoration should be applied to the reproduced signals from these tracks at an increased frequency, the reproduced video images hardly present quality deterioration at regions immediately before and after the edit IN and OUT points.

The foregoing embodiment is described with respect to the case where the data including mainly the high definition data of only either one of the fields is allotted to the first or last one of a plurality of tracks constituting one frame. However, even if the high definition data of each field constituting one frame are mixedly allotted in the first and last tracks, the effects similar to those of the foregoing embodiment can be demonstrated provided that ID codes are recorded in advance which are capable of discriminating which of the fields the high definition data included mixedly in the track belongs to.

Further, the foregoing embodiment is described in the case of the editing carried out by the frame. However, it may be also appropriate to record the high definition data in the field distributively in the first and last ones of a plurality of tracks for each field of the video data. With this arrangement, the above effects can be demonstrated and the editing can be carried out by the field.

EMBODIMENT 2

Figure 1:
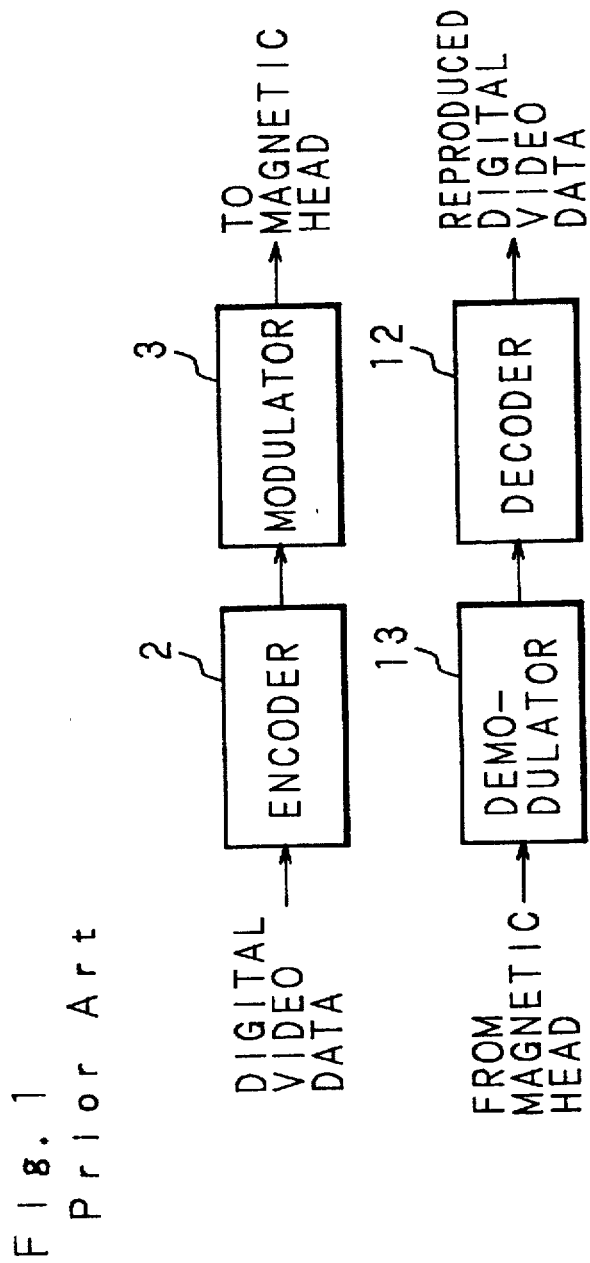
FIG. 1 is a block construction diagram of a video data recording/reproducing apparatus of the prior art.
Figure 2A:
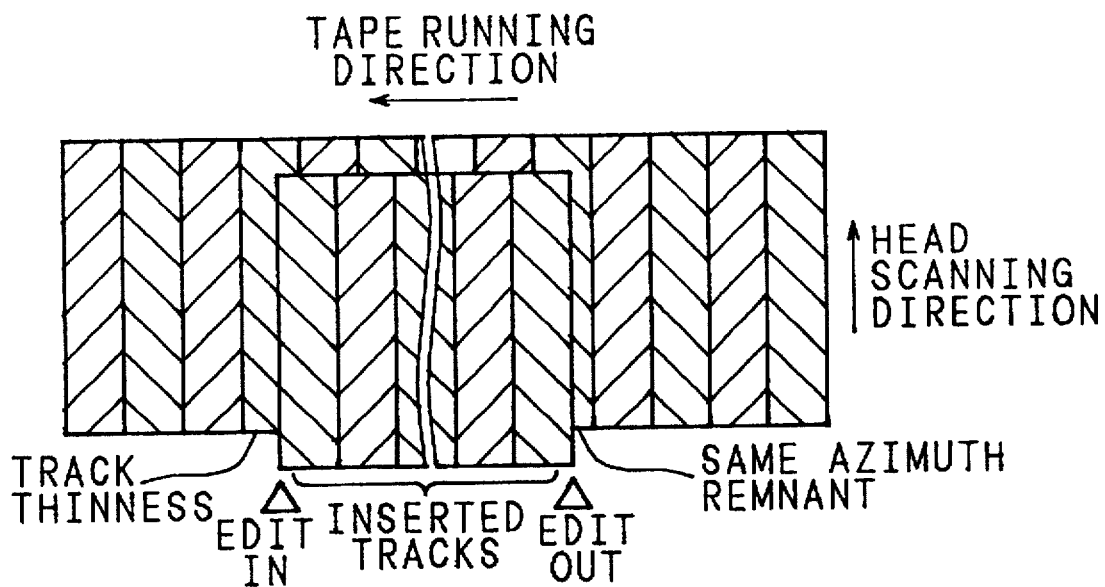
FIG. 2(a) is a diagram showing a state of the recording tracks during an editing operation in the video data recording/reproducing apparatus of the prior art.
Figure 2B:
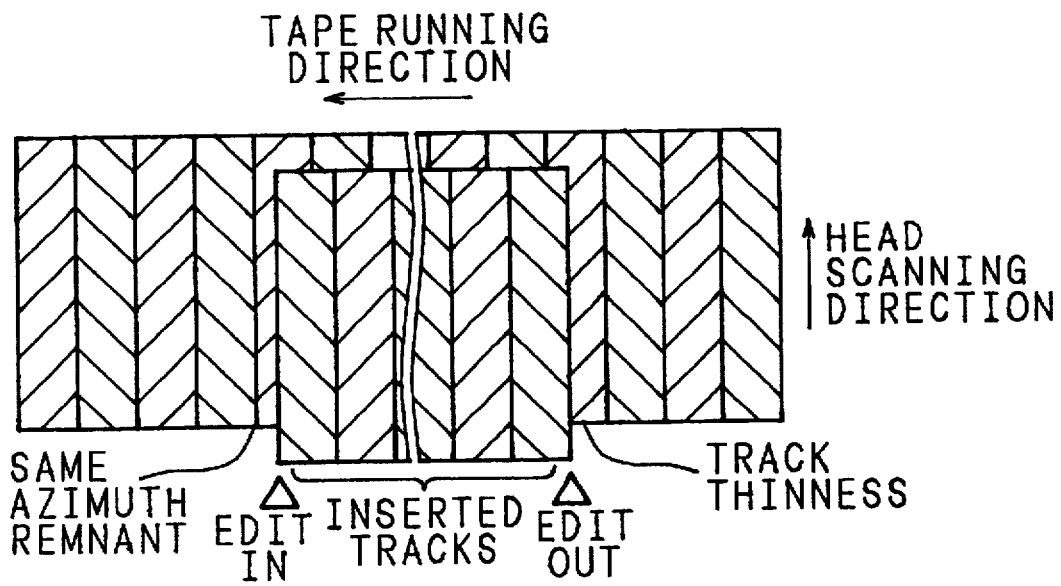
FIG. 2(b) is a diagram showing a state of the recording tracks during an editing operation in the video data recording/reproducing apparatus of the prior art.
Figure 7A:
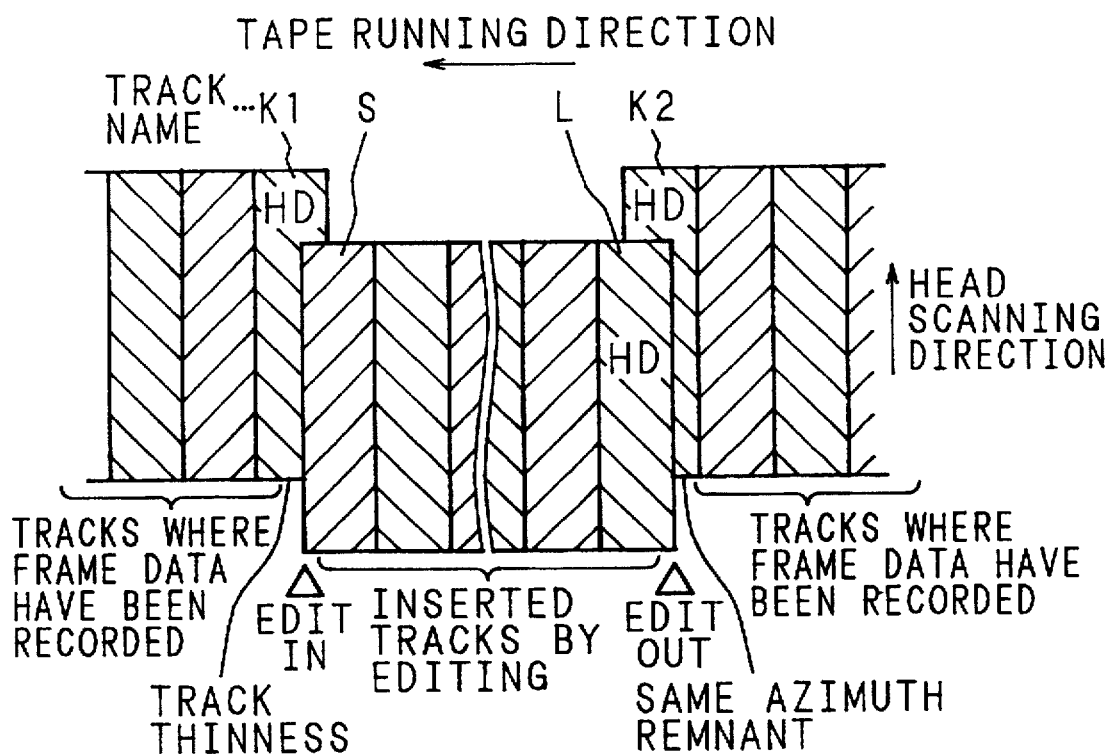
FIG. 7(a) is a diagram showing a state of the recording tracks during the editing operation in the invention.
Figure 7B:
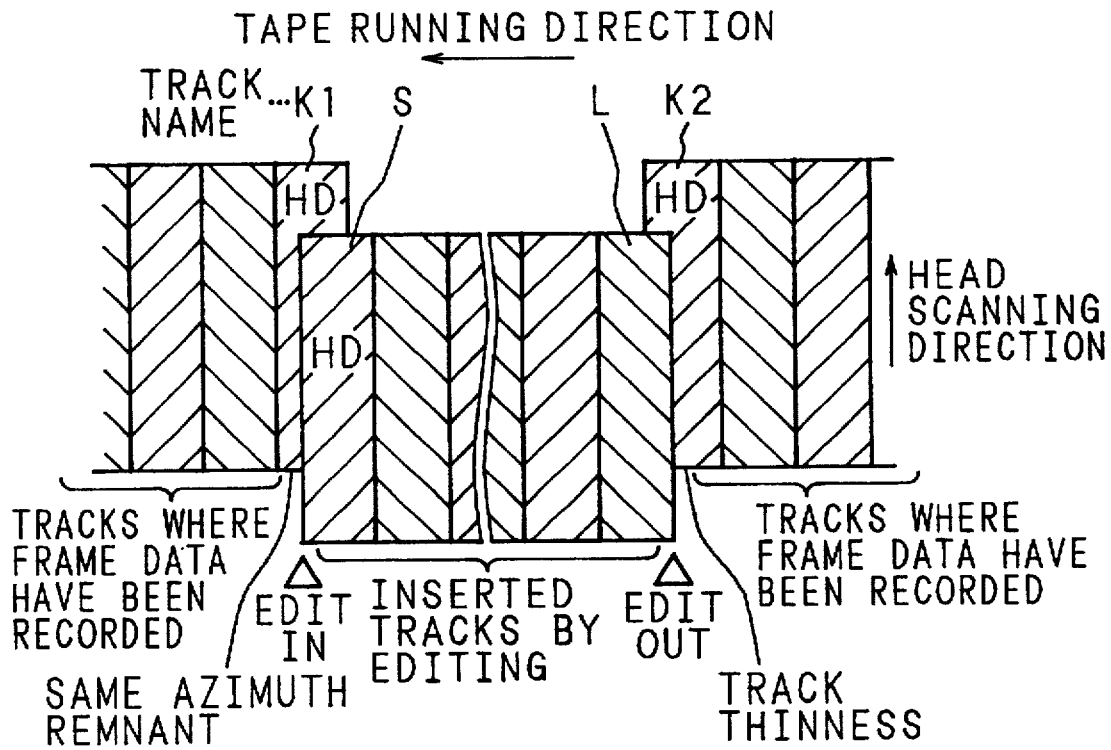
FIG. 7(b) is a diagram showing a state of the recording tracks during the editing operation in the invention.

Although the high definition data is allotted to both the first and last ones of a plurality of tracks constituting one frame in the embodiment 1, the high definition data may be allotted to only either one of the first and last tracks. More specifically, if the tracks are controllably linked at the edit IN and OUT points such that the track thinness and the same azimuth remnant occur at the edit IN point and the edit OUT point constantly respectively in the editing/recording operation as shown in FIG. 2(a), it may be appropriate to allot the high definition data HD only in the last one of a plurality of tracks constituting one frame as shown in FIG. 7(a). In this case, both the track K1 in which the track thinness has occurred and the track L in which the same azimuth remnant has occurred are the last ones of the plurality of tracks. Accordingly, the effects similar to those of the embodiment 1 are demonstrated even if the high definition data reproduced from these tracks is used. Further, if the tracks are controllably linked at the edit IN and OUT points such that the same azimuth remnant and the track thinness occur at the edit IN point and the edit OUT point constantly respectively in the editing/recording operation as shown in FIG. 2(b), it may be appropriate to allot the high definition data HD only in the first one of a plurality of tracks constituting one frame as shown in FIG. 7(b). In this case, both the track S in which the same azimuth remnant has occurred and the track K2 in which the track thinness has occurred are the first ones of a plurality of tracks. Accordingly, the effects similar to those of the embodiment 1 are demonstrated even if the high definition data reproduced from these tracks is used.

Here is shown the case where the editing is carried out by the frame. In this case, the high definition data of either one of the first and second fields constituting one frame is allotted and recorded in the last one of a plurality of tracks constituting one frame as shown in FIG. 7(a) or in the first one of a plurality of tracks constituting one frame as shown in FIG. 7(b) as an data including mainly the high-frequency components. Further, in the case of the editing carried out by the field, the high definition data in the field may be allotted to the first one of a plurality of tracks constituting one field or the last one of a plurality of tracks constituting one field.

EMBODIMENT 3

Figure 8A:
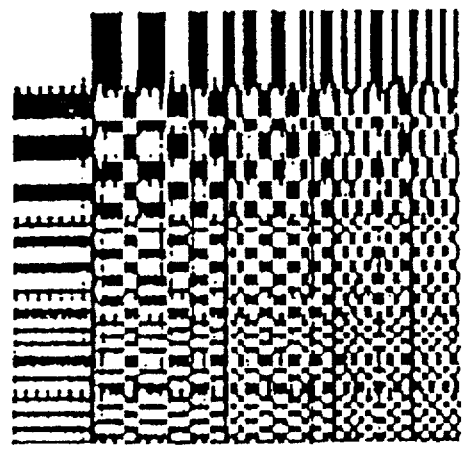
FIG. 8(a) is a diagram showing a basic image of the two-dimensional DCT.
Figure 8B:
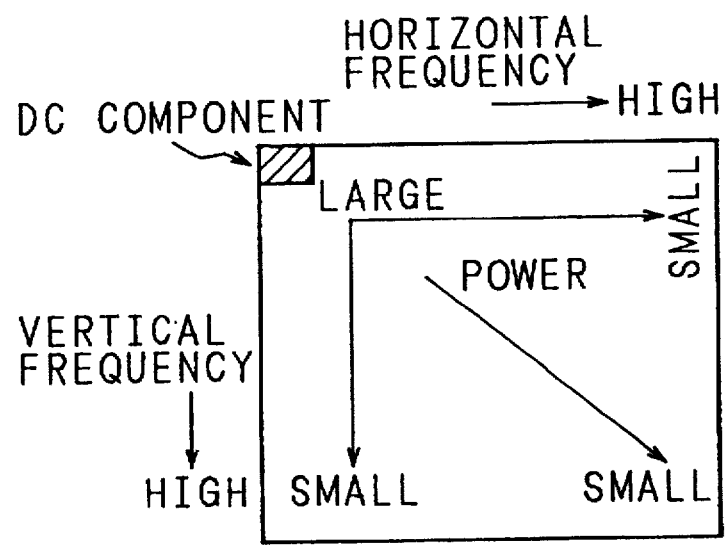
FIG. 8(b) is a diagram showing a transformation factor power of the image of FIG. 8(a)

In the embodiment 1, the data including mainly the high-frequency components and the data including mainly the low-frequency components allotted in the individual recording tracks are constructed by dividing the input digital video data in terms of the band into the frequency components in the data divider 1 in FIG. 3. However, the construction of these data is not limited to this. More specifically, in the data divider 1, one picture of digital video data is divided into blocks including N pixels in the horizontal and vertical directions (N×N) and the two-dimensional discrete cosine transform (DCT) is applied to the respective blocks to thereby compress the data, as an example of a transform coding. FIG. 8(a) shows a well-known basic image of the two-dimensional DCT (8×8), and FIG. 8(b) shows a transformation factor power of its image block. The general property is that the power of the low-frequency components of the transformation factor is large. There are blocks including relatively many high-frequency components compared to the other blocks. Accordingly, in the data divider 1, the blocks are divided into those including relatively many high-frequency components and those including low-frequency components. The blocks including relatively many high-frequency components may be allotted to either one or both of the first and last one of a plurality of tracks constituting of the video data for a predetermined period, and the blocks including many low-frequency components may be allotted to the other tracks. With this arrangement, the effects similar to those of the foregoing embodiments can be demonstrated. Further, each block may be divided uniformly into high-frequency components and low-frequency components (for example, the high-frequency components and the low-frequency components in a right lower half and a left upper half divided by a diagonal line connecting a right upper corner and a left lower corner in FIG. 8(b)). An aggregate of the high-frequency components for each block may be allotted to either one or both of the first and last one of a plurality of tracks constituting the video data for the predetermined period. An aggregate of the low-frequency components for each block may be allotted to the other tracks. With this arrangement, the effects similar to those of the foregoing embodiments can be demonstrated. It will be appreciated that the transform coding such as DCT is not limited to the two-dimensional one, but may be a one-dimensional or three-dimensional one.

EMBODIMENT 4

In the embodiment 1, there are used all the results of the error correction and reformation concerning the reproduced signals from the tracks in which the data including mainly the high-frequency components is recorded. Contrary to this, all the results of the error correction and reformation concerning the reproduced signals from the tracks in which the data including mainly the high-frequency components is recorded may not be used always. In this case, for example, a track address capable of discriminating the first and last one of a plurality of tracks constituting the video data for the predetermined period may be provided in the ID code on each recording track shown in FIG. 5. During a reproducing operation, the data including mainly the high-frequency components in the video data for the predetermined period allotted in the first or last track discriminated using the track address is not used. More specifically, the results of the error correction and restoration concerning the reproduced signals from the first or last track in which the data including mainly the high-frequency components in the video data for the predetermined period are not used at regions other than those immediately before and after the edit IN and OUT points. Accordingly, the reproduced video image may look slightly unsharp constantly for the want of the high definition data in the reproducing operation. This in turn produces the advantage that the quality of the reproduced video image at regions immediately before and after the edit IN and OUT points and other regions does not differ from that at the other regions.

In the embodiment 4, the results of the error correction and restoration concerning the reproduced signals of the data including mainly the high-frequency components are not used uniformly both in the first or last one of a plurality of tracks constituting the video data for the predetermined period at regions immediately before and after the edit IN and OUT points and in the first or last one of a plurality of tracks at the other regions. It may be appropriate not to use the results of the error correction and restoration concerning the reproduced signals from the first or last one of a plurality of tracks immediately after and before the edit IN point and edit OUT points where many errors are liable to occur, and to use all the results of the error correction and restoration concerning the reproduced signals from the other tracks. In this case, an index signal capable of discriminating the edit IN point or edit OUT point is recorded, for example, in the first one of a plurality of tracks constituting the video data for the first predetermined period inserted immediately after the edit IN point to edit, or in the last one of a plurality of tracks constituting the video data for the last predetermined period inserted immediately before the edit OUT point to edit. During the reproducing operation, the edit IN point or edit OUT point is discriminated using this index signal, and only the results of the error correction and restoration concerning the reproduced signals from the first or last one of the plurality of tracks immediately before and after the edit IN and OUT points are not used. In other words, the results of the error correction and restoration concerning the reproduced signals from the first or last track in which the data including mainly the high-frequency components in the video data for the predetermined period is recorded are not used only at regions immediately before and after the edit IN and OUT points. Thus, the viewer will hardly sense the unnaturalness in the reproduced video image although there is a slight difference in the resolution between the reproduced video image at the regions immediately before and after the edit IN and OUT points and the one at the other regions.

EMBODIMENT 5

Figure 9:
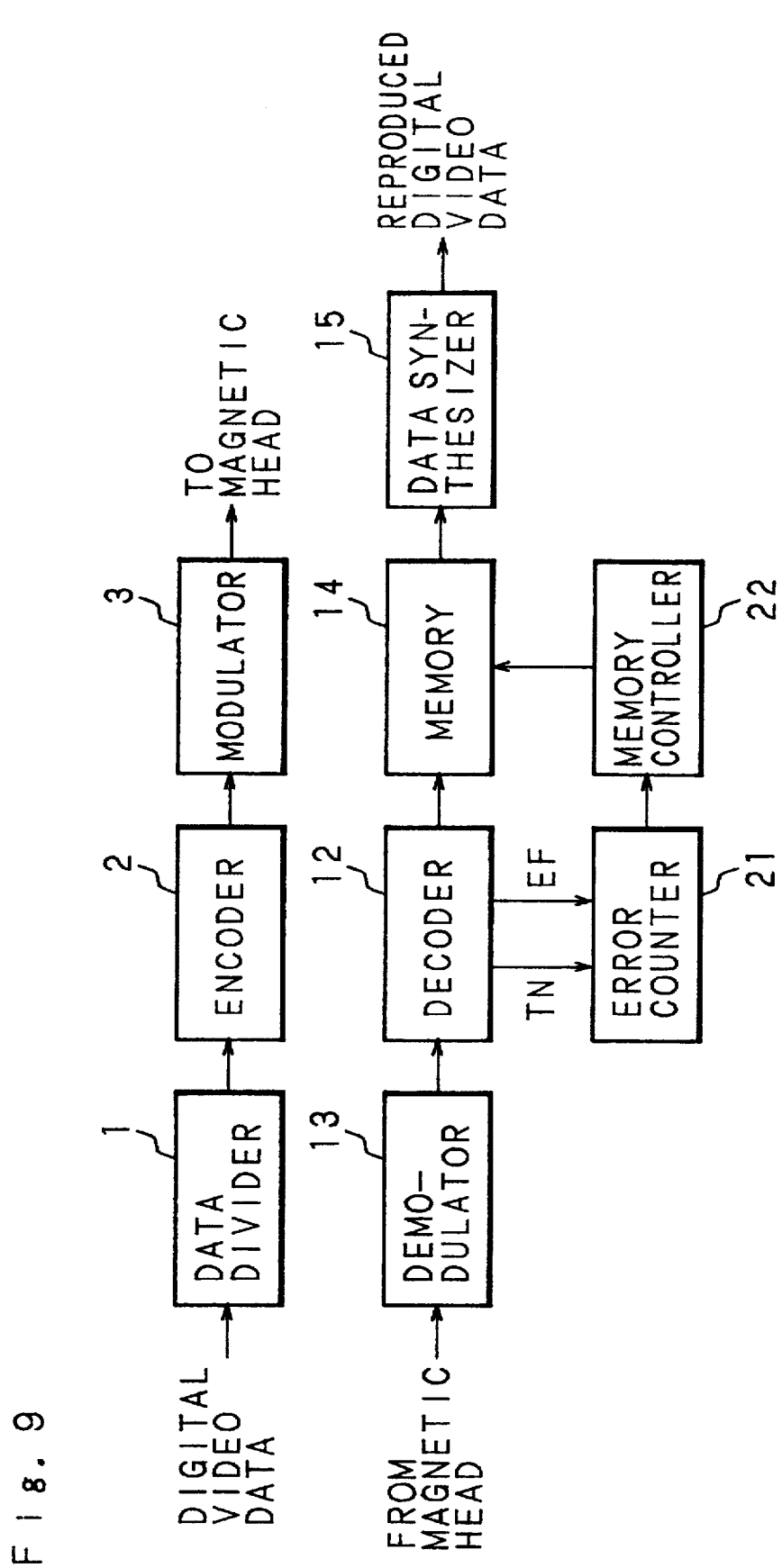
FIG. 9 is a block construction diagram of another video data recording/reproducing apparatus according to the invention.

FIG. 9 is a block diagram showing a principal construction of data processing system of another digital VTR according to the invention. In FIG. 9, parts designated at the same reference numerals in FIG. 3 are identical to those shown in FIG. 3, and description thereof is not given. In a reproducing processing system of FIG. 3, indicated at 14 a memory having a capacity of storing a video data for a predetermined period, at 21 an error counter for counting an error occurring frequency, and at 22 a memory controller for controlling the writing/reading to or from the memory 14.

A track pattern formed when one frame of video data is recorded on a magnetic tape in this embodiment is similar to the one of the foregoing embodiment (see FIG. 4), and accordingly no description will be given thereon. Hereafter, operations of this embodiment will be described with reference to FIGS. 9 and 4.

Figure 10:
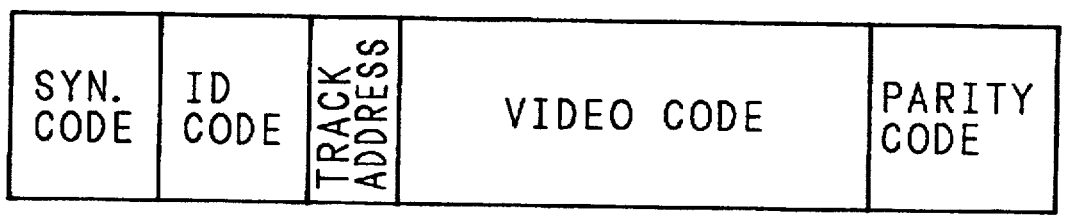
FIG. 10 is a diagram showing a data construction for one block on each recording track in the invention.

In FIG. 9, in a data divider 1 to which a digital data concerning a video data is input, the digital video data are divided into high-frequency components and low-frequency components for each picture of video data constituting one frame, and thus divided high-and-low-frequency components are arranged in the track order shown in FIG. 4 respectively. In an encoder 2, each frame of divided data from the data divider 1 is further divided into blocks in accordance with a division information corresponding to the respective tracks, and the coding is carried out by adding to each block of data a parity code used to detect and correct an error in a video code during the reproducing operation together with a synchronizing code, an ID code, and a track address. This coded data is recorded helically on the magnetic tape through an unillustrated recording head after being digitally modulated in a modulator 3. FIG. 10 illustrates one block in a helical track recorded on the magnetic tape. A plurality of blocks each consisting of the synchronizing code, ID code, track address, video code, and parity code are recorded continuously on the helical track. It will be appreciated that the track address includes track numbers capable of discriminating the first and last tracks out of eight tracks constituting one frame.

FIG. 6 shows a state of the recording tracks when the assemble editing and insert editing are carried out in the VTR as described above. FIG. 6 shows an occurrence of track thinness in which a part of a previously recorded old track positioned immediately before an edit IN point, i.e. the last track K1 of the eight tracks corresponding to one frame of video data, is overwritten by a first one (track S) of eight tracks constituting a new frame immediately after the edit IN point. Further, at an edit OUT point, a previously recorded old track positioned immediately therebefore remains to be erased (same azimuth remnant).

There will be next described operations carried out in the reproducing operation. The reproduced digital codes from the respective tracks obtained by demodulating digitally the reproduced signals from the magnetic head in a demodulator 13 are input to a decoder 12. In the decoder 12, error detection is applied to each block of the reproduced data using the parity code added to each block in the encoder 2 in the recording operation. Any error is corrected if detected. If an error is detected which cannot be corrected, the restoration is carried out, for example, by replacing the erroneous data with data synthesized from correct pixels in the vicinity of a pixel which could not be corrected, so that the video data carrying no error is output to the memory 14. The writing in the memory 14 is controlled by the memory controller 22 so as to store these video data in the memory 14. At the same time, the decoder 14 detects an error detection flag EF representing the detection of the error and the track number TN in the track address provided for each block during the recording operation, and outputs these to the error counter 21. In the error counter 21, the first and last tracks are selected out of a total of eight tracks constituting each frame of video data in accordance with the input track number TN, and the number of the detection of the input error detection flag EF for the first and last tracks is compared with a specified threshold value. If the number of the detection of the input error detection flag EF is smaller than the threshold value, the memory controller 22 sends such a control signal to the memory 14 upon receipt of the comparison result that the memory 14 reads all the data after the error correction and restoration of these tracks written therein. Upon receipt of the comparison result indicating that the number of the detection of the error detection flag EF is in excess of the threshold value, the memory controller 22 sends to the memory 14 such a control signal that the memory 14 does not read the data from these tracks written therein.

Accordingly, the track thinness and the same azimuth remnant found immediately before and after the edit IN point or edit OUT point as shown in FIG. 6 do not occur in the continuously recorded tracks except for the case where the edit IN and OUT points exist in association with the editing operation. Thus, in this case, a small number of errors occur and the number of the detection of the error detection flag EF is smaller than the threshold value, with the result that the memory controller 22 sends to the memory 14 such a signal that the memory 14 reads all the data written therein. The data read from the memory 14 are reconstructed into the original frame of video data through the operations the data synthesizer 15 in the reverse order from those carried out in the data divider 1, and are output as the digital video data.

On the other hand, in the case where the edit IN and OUT points as shown in FIG. 6 are included, the track thinness occurs at the track K1 immediately before the edit IN point in the reproducing operation. Accordingly, the level of the reproduced output from the track K1 is reduced, thereby increasing the probability that many errors occur in the reproduced digital code. This increases greatly the frequency at which the error correction and restoration are conducted in the decoder 12. Thus, if the data corresponding to the track K1 are read as they are from the memory 14 in which the output data of the decoder 12 are written, one frame of reproduced video image including the track K1 and output from the data synthesizer 15 looks very unnatural. This phenomenon may occur more frequently if the recording tracks of the VTR are narrowed. Although a track S positioned immediately after the edit IN point is formed to have a normal track width in a recording state shown in FIG. 4, the tracking may be disordered at the seam of the edit IN point depending upon the accuracy of tracking control in the reproducing operation. Thus, the track S is influenced from the off-track, and the first reproduced video image after the edit IN point including the track S may look very unnatural.

In view of this, the memory controller 22 operates in the following manner based on the comparison result obtained by comparing the number of the detection of the error detection flag EF with a specified threshold value in each of the last track K1 and the first track S immediately before and after the edit IN point. Specifically, if the number of the detection of the input error detection flag EF is smaller than the threshold value, the memory controller 22 sends to the memory 14 such a control signal that all the data concerning these tracks are read from the memory 14. If the number of the detection of the error detection flag EF is in excess of the threshold value, the memory controller 22 sends to the memory 14 such a control signal that the data concerning these tracks are not read from the memory 14. In other words, the memory controller 22 carries out the above operation according to the error occurring frequency in these tracks Further, an area in the vicinity of the edit OUT point in FIG. 6 is reproduced similarly to the case where the area in the vicinity of the edit IN point is reproduced. More specifically, the memory controller 22 controllably determines whether the data concerning the last track (track L) in the last inserted picture of video data positioned immediately before the edit OUT point and the first track (track K2 in the previously recorded picture of video data positioned immediately after the edit OUT point are read from the memory 14 according to the error occurring frequency in these tracks.

As seen from the above, the high-frequency component data generally accounting for a small proportion in one picture of video data are recorded in each of the tracks K1, S positioned immediately before and after the edit IN point and the tracks L, K2 positioned immediately before and after the edit OUT point. Accordingly, even if the error occurring frequency increases in these tracks in the reproducing operation and consequently the data concerning these tracks which have been written in the memory 14 are not read therefrom, the quality of the reproduced video images are hardly deteriorated since only the high definition data in one picture of video data is not used as the data. Conversely, if the error occurring frequency does not increase in the reproducing operation and consequently all the data concerning these tracks which have been written in the memory 14 are read therefrom, the reproduced video image is allowed to have the resolution substantially equivalent to that of the video data during the recording operation since the high definition data can be used.

In the foregoing embodiment, in the recording operation, it is controllably determined whether the data concerning the tracks should be read from the memory 14 according to the error occurring frequency in the tracks independently for the tracks K1, S positioned immediately before and after the edit IN point and the tracks L, K2 positioned immediately before and after the edit OUT point. However, the control may be executed in the following manner, for example. If the error occurring frequency increases in the track K1 positioned immediately before the edit IN point in the reproducing operation and consequently the data concerning this track are not read from the memory 14, this case is determined as an error at the edit IN point and the data concerning the track S positioned immediately after the edit IN point are not read from the memory 14 unconditionally. Likewise, if the error occurring frequency increases in the track L positioned immediately before the edit OUT point in the reproducing operation and consequently the data concerning this track are not read from the memory 14, the data concerning the track K2 positioned immediately after the edit OUT point may not be read from the memory 14 unconditionally. With this control, the high definition data is not used in the video data both immediately before and after the edit IN point, the quality of the reproduced video image can be well-balanced immediately before and after the IN point. Thus, the deterioration in the image quality due to the loss of the high definition data becomes further unnoticeable. The same result, is also obtainable immediately before and after the edit OUT point.

The foregoing embodiment is described with respect to the case where the high definition data of only either one of the fields is allotted to the first or last one of a plurality of tracks constituting one frame. However, even if the high definition data of each field constituting one frame are mixedly allotted to the first and last tracks, the effects similar to those of the foregoing embodiment can be demonstrated provided that ID codes are recorded in advance which are capable of discriminating which of the fields the high definition data included mixedly in the track belongs to.

Further, the foregoing embodiment is described in the case of the editing carried out by the frame. However, it may be also appropriate to record the high definition data in the field distributively in the first and last ones of a plurality of tracks concerning each field of the video data. With this arrangement, the above effects can be demonstrated and the editing can be carried out by the field.

EMBODIMENT 6

Although the high definition data is allotted to both the first and last ones of a plurality of tracks constituting one frame in the embodiment 5, the high definition data may be allotted to only either one of the first and last tracks. More specifically, if the tracks are controllably linked at the edit IN and OUT points such that the track thinness and the same azimuth remnant occur at the edit IN point and the edit OUT point constantly respectively in the editing/recording operation as shown in FIG. 2(a), it may be appropriate to allot the high definition data HD only in the last one of a plurality of tracks constituting one frame as shown in FIG. 7(a). In this case, both the track K1 in which the track thinness has occurred and the track L in which the same azimuth remnant has occurred are the last ones of the plurality of tracks. Accordingly, the effects similar to those of the embodiment 5 are demonstrated even if it is determined suitably whether the results of the error correction and restoration of the high definition data reproduced from these tracks are used. Further, if the tracks are controllably linked at the edit IN and OUT points such that the same azimuth remnant and the track thinness occur at the edit IN point and the edit OUT point constantly respectively in the editing/recording operation as shown in FIG. 2(b), it may be appropriate to allot the high definition data HD only in the first one of a plurality of tracks constituting one frame as shown in FIG. 7(b). In this case, both the track S in which the same azimuth remnant has occurred and the track K2 in which the track thinness has occurred are the first ones of the plurality of tracks. Accordingly, the effects similar to those of the embodiment 5 are demonstrated even if it is determined suitably whether the results of the error correction and restoration of the high definition data reproduced from these tracks are used.

Here is shown the case where the editing is carried out by the frame. In this case, the high definition data of either one of the first and second fields constituting one frame is allotted and recorded in the last one of a plurality of tracks constituting one frame as shown in FIG. 7(a) or in the first one of a plurality of tracks constituting one frame as shown in FIG. 7(b) as data including mainly the high-frequency components. Further, in the case of the editing carried out by the field, the high definition data in the field may be allotted to the first one of a plurality of tracks constituting one field or the last one of a plurality of tracks constituting one field.

In the embodiments 5 and 6, the error occurring frequency for the reproduced signals concerning the data including main the high-frequency components from the tracks is counted uniformly in the first and last ones of a plurality of tracks constituting the video data for the predetermined period immediately before and after the edit IN and OUT points and in the first and last ones of the plurality of tracks at other regions. However, it may also be appropriate to count only the error occurring frequency for the reproduced signals from the first and last ones of the plurality of tracks immediately before and after the edit IN and OUT points where many errors are liable to occur, and to determined whether the results of the error correction and restoration of the data including mainly the high-frequency components which are reproduced from these tracks should be used according to the error occurring frequency. In this case, an index signal capable of discriminating the edit IN point or edit OUT point is recorded, for example, in the first one of a plurality of tracks constituting the video data for the predetermined period inserted immediately after the edit IN point to edit, or in the last one of a plurality of tracks constituting the video data for the predetermined period inserted immediately before the edit OUT point to edit. In the reproducing operation, the edit IN point or edit OUT point is discriminated using this index signal, and it is determined according to the error occurring frequency concerning the reproduced signals from the first or last one of the plurality of tracks immediately before and after the edit IN and OUT points whether the results of the error correction and restoration should be used. In other words, the results of the error correction and restoration concerning the reproduced signals from the first or last track in which the data including mainly the high-frequency components in the video data for the predetermined period is recorded are used or not used according to the error occurring frequency only immediately before and after the edit IN and OUT points. Thus, the viewer will hardly sense the unnaturalness in the reproduced video image although there is a slight difference in the resolution between the reproduced video image immediately before and after the edit IN and OUT points and the one at the other regions.

EMBODIMENT 7

In the embodiments 5 and 6, the data including mainly the high-frequency components and the data including mainly the low-frequency components allotted in the individual recording tracks are constructed by dividing the input digital video data in terms of the band into these frequency components in the data divider 1 in FIG. 9. However, the construction of these information is not limited to such strict frequency division. In other words, similar to the aforementioned embodiment 3, the respective blocks may be divided by the data divider 1 into the high-frequency components and the low-frequency components in accordance with the transformation factor by the DCT. The operations carried out at this time are same as the one described in the embodiment 3, and accordingly no description will be given thereon.

EMBODIMENT 8

Figure 11:
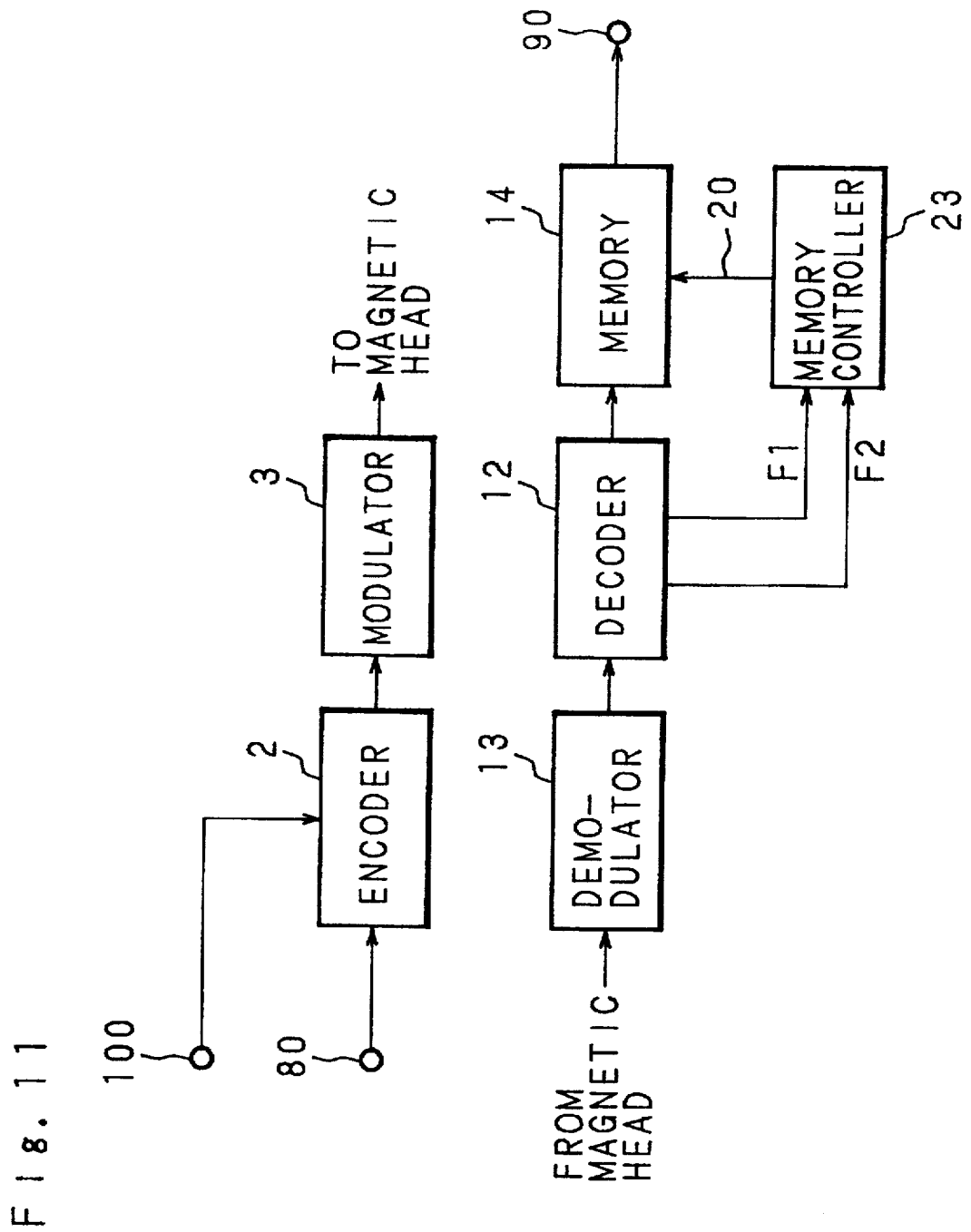
FIG. 11 is a block construction diagram of still another video data recording/reproducing apparatus according to the invention.

FIG. 11 is a block construction diagram of another video data recording/reproducing apparatus according to the invention. In a recording processing system of FIG. 11, indicated at 80 is an input terminal for a digital data concerning the video data to be recorded, at 100 an editing control terminal, at 2 an encoder, and at 3 is a modulator. In a reproducing processing system, indicated at 13 is a demodulator, at 12 a decoder including mainly an error detecting/correcting circuit, at 14 a memory for storing a digital data of video images for a predetermined period, at 23 a memory controller, and at 90 an output terminal for the digital video data.

Figure 12:
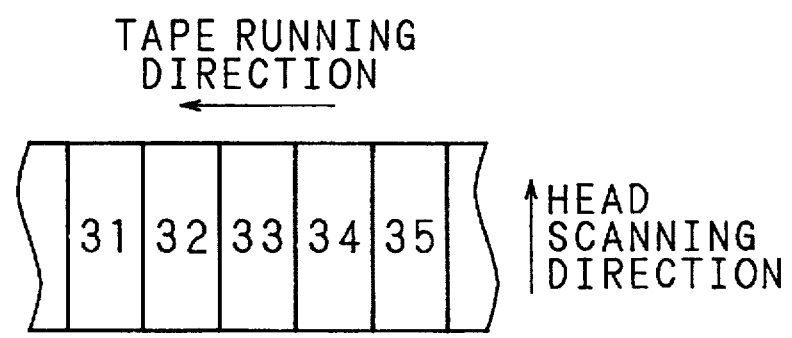
FIG. 12 is a diagram showing the recording tracks constituting one frame of video data in the invention.

Operations carried out at the time of recording will be described with reference to FIGS. 11 and 12. FIG. 12 illustrates a state of track pattern formed when frames of video data are recorded on a magnetic tape in this embodiment. Although FIG. 12 shows as if each frame of video data consists of one track as seen in tracks 31 to 35 in order to facilitate the explanation, each of the first and second fields in fact consists of one track. That is to say, each frame of video data consists of a plurality of tracks such as two tracks. The number of tracks constituting one field of video-data is not limited to one. One field of video data may be dividingly recorded over a plurality of tracks through known methods such as a multichannel recording, multisegment recording, and multichannel multisegment recording. The number of tracks constituting one frame of video data is not particularly limited.

Figure 13:
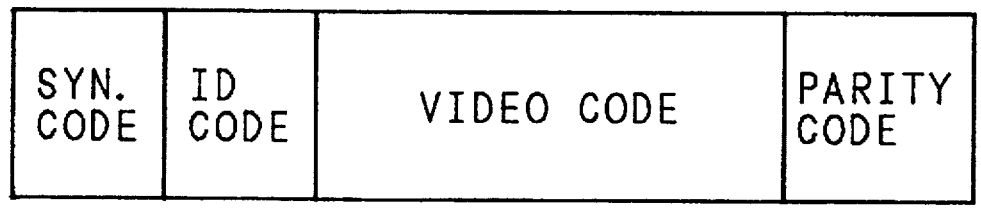
FIG. 13 is a diagram showing a data construction for one block on each recording track in the invention.

In FIG. 11, in the encoder 2 to which the digital video data from the input terminal 80 is input, the input video data is divided into blocks in accordance with the division information corresponding to the respective tracks for each frame, and the coding is applied to each block by adding a parity code for carrying out the error detection and correction in the reproducing operation as well as a synchronizing code or ID code to each block. Thus obtained digital code is output to the modulator 3. The digital code input to the modulator 3 is converted into a signal in such a form suitable for the recording and is recorded helically on a magnetic tape through an unillustrated recording head. FIG. 13 illustrates one block in a helical track recorded on the magnetic tape. A plurality of blocks each consisting of the synchronizing code, ID code, video code, and parity code are recorded continuously on the helical track.

Figure 14:
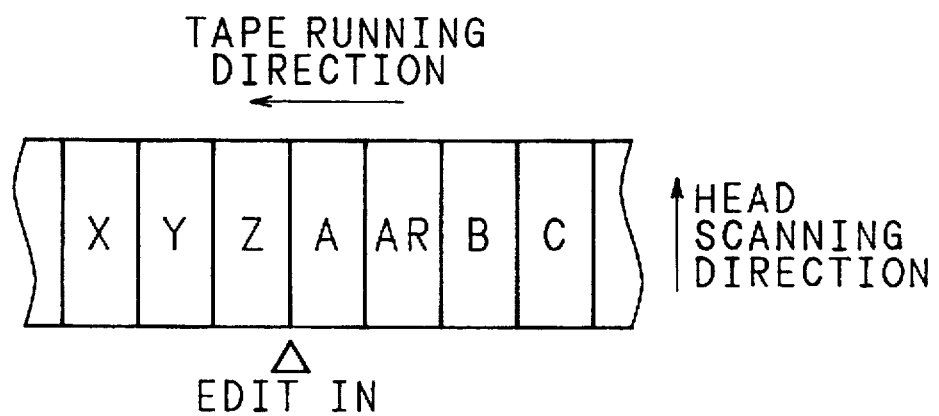
FIG. 14 is a diagram showing a state of the recording tracks in the vicinity of the edit IN point in the invention.

FIG. 14 shows a state of the recording tracks when the assemble editing or insert editing is carried out in the VTR as described above. In FIG. 14, new data are recorded by the edit IN following a frame of previously recorded video data Z positioned immediately before the edit IN point. This state is described with reference to FIG. 11. When a signal is sent from the editing control terminal 100 in FIG. 11 to the encoder 2 so as to designate the start of the recording by the edit IN, the first frame of video data is output from the encoder 2 twice in a row only during the first two consecutive frame periods immediately after the start of the recording. Thereafter, frames of video data input continuously are output in time series frame by frame from the encoder 2, and recorded through the modulator 3.

Figure 15:
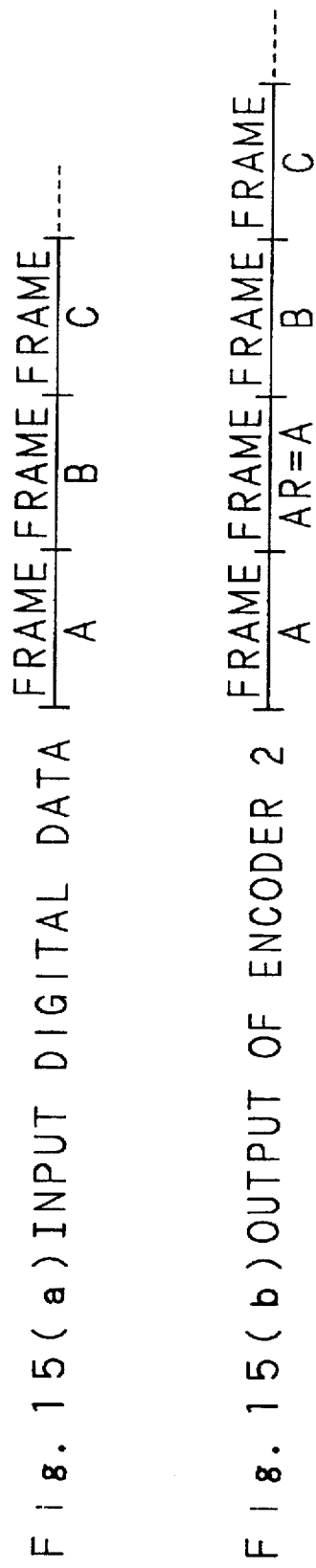
FIG. 15(a) is a diagram for explaining recorded frames in the vicinity of the edit IN point in the invention.
FIG. 15(b) is a diagram for explaining recorded frames in the vicinity of the edit IN point in the invention.

FIG. 15 shows the video data to be recorded immediately after the edit IN point. FIG. 15(a) shows the digital video data A, B, C, . . . input from the input terminal 80 by the frame after the edit IN point. On the contrary, FIG. 15(b) shows the video data to be recorded A, AR, B, C, . . . output from the encoder 2 by the frame. In FIG. 15(b), AR is a frame obtained by recording the first frame of video data A again (AR =A). After the frame B, the video data are recorded frame by frame. In the recording tracks shown in FIG. 14, frames of video data in the newly recorded tracks after the edit IN point are indicated at symbols A, AR, B, C, . . . same as those in FIG. 15(b). Although each frame in reality consists of a plurality of tracks, each frame consists of one track in order to facilitate the explanation here.

At this time, at least the digital codes concerning the track A constituting the first frame A after the edit IN point which are output from the encoder 2 are recorded such that the ID code for each block shown in FIG. 13 includes a start ID) data indicative of the start of the recording. The start ID information is not recorded limitedly on the track constituting the frame A, but may be recorded any place provided that it is given to recognize the edit IN point during the reproducing operation. For example, the start ID data may be recorded in the next frame AR.

Figure 16:
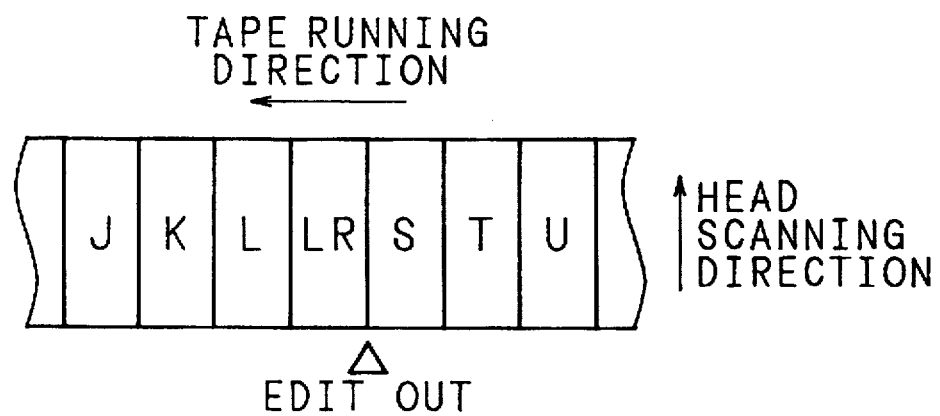
FIG. 16 is a diagram showing state of the recording tracks in the vicinity of the edit OUT point in the invention.

There will be described a processing carried out in completing the recording at the edit OUT point. When a signal is sent from the editing control terminal 100 of FIG. 11 to the encoder 2 so as to designate the end of the recording at the edit OUT point, the same frame of video data is output twice in a row only during the last two consecutive frame periods immediately before the end of the recording from the encoder 2 to the modulator 3, thereby completing the recording. FIG. 16 shows recording tracks in the vicinity of the edit OUT point. FIG. 17(a) shows the digital video data . . . , J, K, L input from the input terminal 80 by the frame immediately before the edit OUT point. On the contrary, FIG. 17(b) shows the video data to be recorded . . . . J, K, L, LR output from the encoder 2 by the frame. In FIG. 17(b), LR is a frame obtained by recording the last frame of video data L again (LR =L). In FIG. 16, the recording tracks corresponding to these frames are indicated at the same symbols similarly when the recording is started.

It will be appreciated that the frames following the frame S in FIG. 16 are frames of the previously recorded old tracks. Although each frame in reality consists of a plurality of tracks, each frame consists of one track in order to facilitate the explanation here.

At this time, at least the digital codes concerning the track LR constituting the last frame LR immediately before the edit OUT point which are output from the encoder 2 are recorded such that the ID code for each block shown in FIG. 13 includes an end ID data indicative of the end of the recording. The end ID data is not recorded limitedly on the track constituting the frame LR, but may be recorded any place provided that it is reproduced to recognize the edit OUT point. The end ID data may be recorded in other regions including the track constituting the preceding frame L.

There will be described operations carried out in the reproducing operation next with reference to FIG. 11. To the decoder 12 are input the reproduced digital codes from the respective tracks obtained by demodulating digitally the reproduced signals from the magnetic head in the demodulator 13. In the decoder 12, the error detection is applied to each block of the reproduced data using the parity code added to each block in the encoder 2 during the recording operation, and any detected errors are corrected. If there is detected an error which cannot be corrected, the restoration is carried out, for example, by replacing with a data synthesized from correct pixels in the vicinity of a pixel which could not be corrected, so that the video data carrying no error is input to the memory 14. These video data are stored in the memory 14 through the writing control from the memory controller 23.

Figure 18:
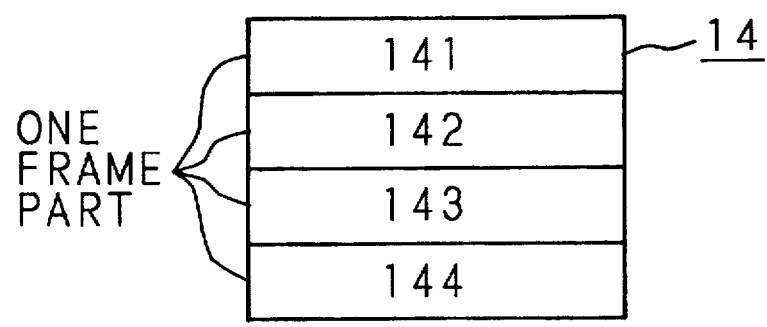
FIG. 18 is a diagram showing a construction of a memory of a reproducing system in the invention.

FIG. 18 shows an example of internal construction of the memory 14 shown in FIG. 11. For example, the memory 14 includes a total of four frames having storage areas 141 to 144 for each frame in this embodiment FIG. 19(a) shows the frames of video data in the vicinity of the edit IN point which are written in the memory 14 in time series, and storage areas provided in the memory 14 for storing these data. In FIG. 19(a), frames . . . , X, Y, Z, A, AR, B, C input in time series to the memory 14 are stored sequentially frame by frame in the storage areas . . . , 141, 142, 143, 144, 141, 142, 143. This area corresponds to recorded areas other than areas immediately before and after the edit IN point in which the data are continuously recorded. For example, the memory controller 23 sends to the memory 14 such a control signal 20 that the reproduced video data such as the frames X and Y written in the memory 14 are read from the areas 141, 142 at a timing delayed by one frame period from the writing timings thereof. The digital video data read from the memory 14 before the frame Z positioned immediately before the edit IN point and output to the output terminal 90 are shown as . . . , X, first Y by the frame in FIG. 19(b).

On the other hand, as described above, upon the reproduction of the start ID data in the ID code added to the track corresponding to the first recorded frame A immediately after the edit IN point in the recording operation, a detection flag F1 is output from the decoder 12 as shown in FIG. 19(c) substantially in synchronism with the writing timing of the frame A shown in FIG. 19(a). When this detection flag F1 is input to the memory controller 23, the memory controller 23 sends to the memory 14 such a control signal 20 that the video data of the frame Z corresponding to the last one of the previously recorded tracks positioned immediately before the edit IN point which has been stored in the area 143 in the memory 14 is not read from the area 143. More specifically, the last frame Z is not used as the reproduced video image.

Figure 21A:
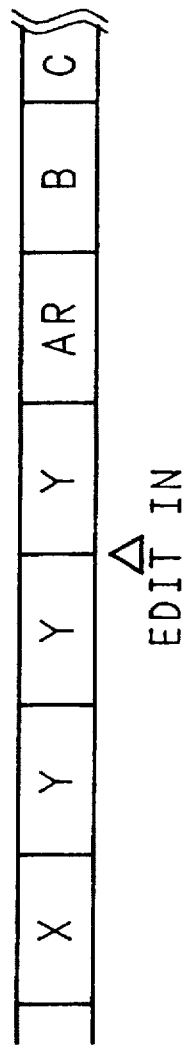
FIG. 21(a) is a diagram showing a reproduced video data in the vicinity of the edit IN point by the frame in the invention.

Likewise, the memory 14 is controlled such that the reproduced video data of the first frame A recorded immediately after the edit IN point which has been recorded in the area 144 in the memory 14 is not read either. Accordingly, this data-is not used as the reproduced video image. As a substitute for the video data of the frames Z and A, the memory 14 is controlled to read the video data of the frame Y which has been recorded in the storage area 142 for further two consecutive frame periods. Consequently, the frame Y is read for three consecutive frame periods in total if the first, Y is included. The video data of the frame AR which has been stored in the area 141 in the memory 14 and of subsequent frames are read from the corresponding storage areas at a timing delayed substantially by one frame period from the writing timings thereof as described above. FIG. 19(b) shows frames of digital video data in the vicinity of the edit IN point which is read from the memory 14 and output to the output terminal 90. Since the memory 14 includes the storage capacity of four frames, the writing and the reading are not carried out at an overlapping timing. FIG. 21(a) shows the aforementioned reproduced video data in the vicinity of the edit IN point in the order of the frames.

Incidentally, as described in the description of the prior art, the track thinness and the same azimuth remnant as shown in FIGS. 2(a), 2(b) generally occur in the track corresponding to the frame Z positioned immediately before the edit IN point and the track corresponding to the frame A positioned immediately after the edit OUT point. Accordingly, the probability is increased that many errors occur in the reproduced digital codes from the tracks of these frames Z, A. This in turn increases greatly the frequency at which the error correction and restoration are conducted in the decoder 12. Thus, if the data corresponding to the frames Z, A are read as they are from the memory 14 in which the output data of the decoder 12 are written, the reproduced images demonstrate the deteriorated quality immediately before and after the edit In point. This phenomenon may occur more frequently if the recording tracks of the VTR are narrowed.

In this respect, if the frames Z and A are not used as the reproduced video images as shown in FIG. 21(a), the reproduced video images do not look deteriorated before and after the edit IN point. Since the frames Y, X before the frame Z and the frames AR (=A), B, C after the frame A are free from the track thinness or the same azimuth remnant, there is no problem in using the video images of these frames.

There will be described a processing carried out in the vicinity of the edit OUT point. FIG. 20(a) shows frames of video data in the vicinity of the edit OUT point which are written in time series in the memory 14, and storage areas for storing these data. In FIG. 20(a), the frames . . . , K, L, LR, S, T, U, . . . input in time series to the memory 14 are stored frame by frame in the areas . . . , 141, 142, 143, 144, 141, 142, . . . in the memory 14. This area corresponds to recorded areas other than areas immediately before and after the edit OUT point in which the data are continuously recorded. For example, the memory controller 23 sends to the memory 14 such a control signal 20 that the reproduced video data of the frames X and Y written in the memory 14 are read from the areas 141, 142 at a timing delayed by one frame period from the writing timings thereof. The digital video data read from the memory 14 before the frame LR positioned immediately before the edit OUT point and output to the output terminal 90 are shown as . . . , K, and first L by the frame in FIG. 20(b).

On the other hand, upon the reproduction of the end ID data in the ID code added to the track corresponding to the last recorded frame LR immediately before the edit OUT point during the recording operation, a detection flag F2 is output from the decoder 12 as shown in FIG. 20(c) substantially in synchronism with the writing timing of the frame LR shown in FIG. 20(a). When this detection flag F2 is input to the memory controller 23, the memory controller 23 sends to the memory 14 such a control signal 20 that the video data of the frame LR corresponding to the last one of the previously recorded tracks positioned immediately before the edit OUT point which has been stored in the area 143 in the memory 14 is not read from the area 143.

More specifically, the last frame LR is not used as the reproduced video image. Likewise, the memory 14 is controlled such that the reproduced video data of the previously recorded frame S immediately after the edit OUT point which has been recorded in the area 144 in the memory 14 is not read, and accordingly this data is not used as the reproduced video image. As a substitute for the video data of the frames LR and S, the memory 14 is controlled to read the video data of the frame L which has been recorded in the storage area 142 for further two consecutive frame periods. Consequently, the frame L is read for three consecutive frame periods in total if the first L is included. The video data of the frame T which has been stored in the area 141 in the memory 14 and subsequent frames are read from the corresponding storage areas at a timing delayed substantially by one frame period from the writing timing thereof as described above.

Figure 21B:
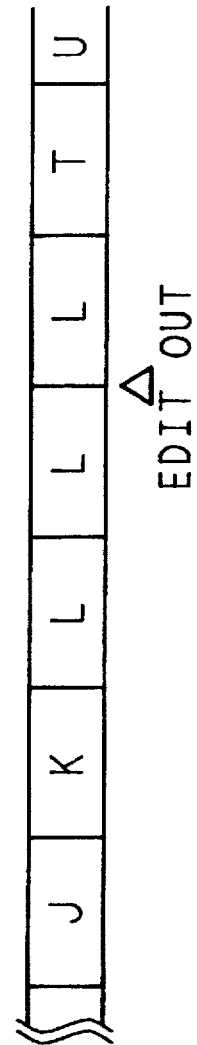
FIG. 21(b) is a diagram showing a reproduced video data in the vicinity of the edit OUT point by the frame in the invention.

FIG. 20(b) shows frames of digital video data in the vicinity of the edit OUT point which are read from the memory 14 and output to the output terminal 90. Since the memory 14 has the storage capacity of four frames, the writing and the reading are not carried out at an overlapping timing. FIG. 21(b) shows the aforementioned reproduced video data in the vicinity of the edit OUT point in the order of the frames. Since the frames L (=LR), K, J before the frame LR and the frames T, U, V after the frame S are free from the track thinness or the same azimuth remnant, there is no problem in using the video images of these frames.

As described above, the following frames are not used as the reproduced video images: the last one of the previously recorded frames Z immediately before the edit IN point; the previously recorded frame S immediately before the edit OUT point; and the frame A out of the frame A, AR constituting the same video data which are recorded for the first two consecutive frame periods immediately after the edit IN point. However, since the frame AR is used as the reproduced video image, no reproduced video image is missing in a region between the edit IN point and the edit OUT point.

Although the embodiment 8 is described with respect to a case where both the frames Z and A immediately before and after the edit IN point are not used, either one of these frames may be used. More specifically, it may be appropriate to count the number of the detected errors in the reproduced signals from the tracks corresponding to the respective frames in the reproducing operation, for example. If a number of detected errors are counted in the last frame Z of the previously recorded ones immediately before the edit IN point due to the track thinness, the frame Z is not used as the reproduced video data. However, since the track thinness is not found in the first frame A which is newly recorded immediately after the edit IN point and a small number of errors are detected therein, the frame A may be used as the reproduced video image. Contrary to this, the frame Z may be used as the reproduced video data while the frame A is not. The same processing can be carried out immediately before and after the edit OUT point similarly to the case of the edit IN point.

EMBODIMENT 9

In the embodiment 8, the first frame of video data right after the start of the recording at the edit IN point and the frame of video data right before the end of the recording at the edit OUT point are recorded at least for two consecutive frame periods. The same frame of video data may be recorded for two consecutive frame periods only either at the start of the recording immediately after the edit IN point or at the end of the recording at the edit OUT point. More specifically, if the tracks are controllably linked at the edit IN and OUT points such that the track thinness and the same azimuth remnant occur at the edit IN point and the edit OUT point constantly respectively in the editing/recording operation as shown in FIG. 2(a), the same frame of video data is recorded twice in a row for the last two consecutive frame periods right before the end of the recording at the edit OUT point as shown in FIG. 22(a), thereby completing the recording of the frames J, K, L, LR (=L).

At least the digital code concerning the track constituting the last frame LR immediately before the edit OUT point which is output from the encoder 2 is recorded such that the ID code for each block shown in FIG. 13 includes the end ID data indicative of the end of the recording. On the other hand, the frames A, B, C, . . . are recorded in time series as they are after the start of the recording immediately after the edit IN point. In addition, the digital code concerning at least the track constituting the first frame A immediately after the edit IN point which is output from the encoder 2 is recorded such that the ID code for each block shown in FIG. 13 includes the start ID data indicative of the start of the recording.

In the reproducing operation, the start ID data recorded in the track corresponding to the first recording frame A immediately after the edit IN point is detected in the decoder 12 of FIG. 11, and is input to the memory controller 23 as a detection flag F1. Thus, similar to the embodiment 8, only the reproduced video data of the frame Z corresponding to the previously recorded track immediately before the edit IN point in which the track thinness has occurred is not used. The frames A, B, C, . . . which are recorded immediately after the edit IN point are used as the reproduced video data.

On the other hand, the end ID data recorded in the track corresponding to the last recording frame LR immediately before the edit OUT point is detected in the decoder 12 of FIG. 11, and is input to the memory controller 23 as a detection flag F2. Accordingly, similar to the embodiment 8, only the reproduced video data of the frame LR corresponding to the last recorded track immediately before the edit OUT point in which the same azimuth remnant has occurred is not used. The reproduced video data of the following frames are used: the frames L, K, J, . . . recorded before the frame LR and the previously recorded frames S, T, U immediately after the edit OUT point. FIG. 22(b) shows the reproduced video data used in the vicinity of the edit IN and OUT points in the order of the frames. In this embodiment, it may be sufficient for the memory 14 to have a storage capacity of, for example, three frames, i.e. to include storage areas 141 to 143.

As is clear from FIG. 22(b), only the previously recorded frame is not used as the reproduced video data in the vicinity of the edit IN point, but all the frames A, B, C, . . . newly recorded after the edit IN point are used. Further, only the last frame LR recorded during the editing operation is not used in the vicinity of the edit OUT point, but the following frames of data are all used: the frame L including the same data as the frame LR and recorded before the frame LR; frames K, J, . . . , the frame S previously recorded after the edit OUT point, and the frames T, U, . . . , etc. Accordingly, the reproduced video images hardly look deteriorated in the vicinity of the edit IN and OUT points. Further, no reproduced video image is missing in a region between the edit IN point and the edit OUT point.

EMBODIMENT 10

If the tracks are controllably linked at the edit IN and OUT points such that the same azimuth remnant and the track thinness occur at the edit IN point and the edit OUT point constantly respectively in the editing/recording operation as shown in FIG. 2(b), the same frame of video data is recorded twice in a row only for the first two consecutive frame periods right after the start of the recording at the edit IN point as shown in FIG. 23(a), and the recording is started in the frame order of A, AR (=A), B, C, . . . . At this time, at least the digital code recorded in the track constituting the first frame A immediately after the edit IN point is recorded such that the ID code for each block shown in FIG. 13 includes the start ID data indicative of the start of the recording. On the other hand, the frames . . . J, K, L are recorded in time series as they are at the edit OUT point, thereby completing the recording. At this time, at least the digital code recorded in the track constituting the last frame L immediately before the edit OUT point is recorded such that the ID code for each frame shown in FIG. 13 includes the end ID data indicative of the end of the recording.

At the time of the reproduction, the start ID data recorded in the track corresponding to the first recording frame A immediately after the edit IN point is detected in the decoder 12 of FIG. 11, and is input to the memory controller 23 as a detection flag F1. Thus, similar to the embodiment 8, only the reproduced video data of the frame A corresponding to the first track immediately after the edit IN point in which the same azimuth remnant has occurred is not used. The previously recorded frames . . . X, Y, Z immediately before the edit IN point and the frames AR (=A), B, C, . . . recorded after the frame A immediately after the edit IN point are used as the reproduced video data.

On the other hand, the end ID data recorded in the track corresponding to the last recording frame L immediately before the edit OUT point is detected in the decoder 12 of FIG. 11, and is input to the memory controller 23 as a detection flag F2. Accordingly, similar to the embodiment 8, only the reproduced video data of the frame S corresponding to the previously recorded track immediately after the edit OUT point in which the track thinness has occurred is not used. The reproduced video data of the following frames are used: the frames . . . J, K, L newly recorded before the edit OUT point; and the previously recorded frames T, U, . . . after the frame S immediately after the edit OUT point. FIG. 28(b) shows the reproduced video data used in the vicinity of the edit IN and OUT points in the order of the frames. In this embodiment, it may be sufficient for the memory 14 to have a storage capacity of, for example, three frames, i.e. to include storage areas 141 to 143.

As is clear from FIG. 23(b), in the vicinity of the edit IN point, only the first frame A recorded immediately after the edit IN point is not used as the reproduced video data, but all the other frames are used, including the frame AR recorded after the frame A and including the same data as A, frames, B, C, . . . , and the previously recorded frames . . .

X, Y, Z immediately before the edit IN point as the reproduced video data. Further, in the vicinity of the edit OUT point, only the first one of the previously recorded frames S immediately after the edit OUT point, but all the other data are used, including the frames . . . J, K, L recorded immediately before the edit OUT point, and the previously recorded frames T, U, . . . after the frame S immediately after the edit OUT point. Accordingly, the reproduced video images hardly look deteriorated in the vicinity of the edit IN and OUT points. Further, no reproduced video image is missing in a region between the edit IN point and the edit OUT point.

In the foregoing embodiments 8, 9, 10, the same frame of video data is recorded for only the first two consecutive frame periods immediately after the edit IN point or for only the last two consecutive frame periods immediately before the edit OUT point. The duration of recording the same frame of video data is not limited to the two frame periods. Further, the storage capacity and the control method of the memory 14 are not limited to those described above.

EMBODIMENT 11

Figure 24A:
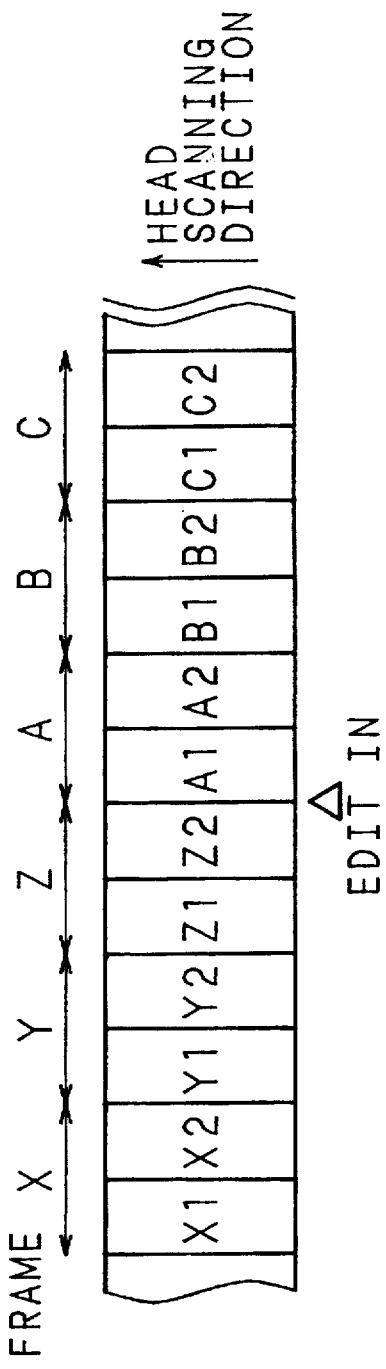
FIG. 24(a) is a diagram showing a state of the recording tracks in the vicinity of the edit IN point in the invention.
Figure 24B:
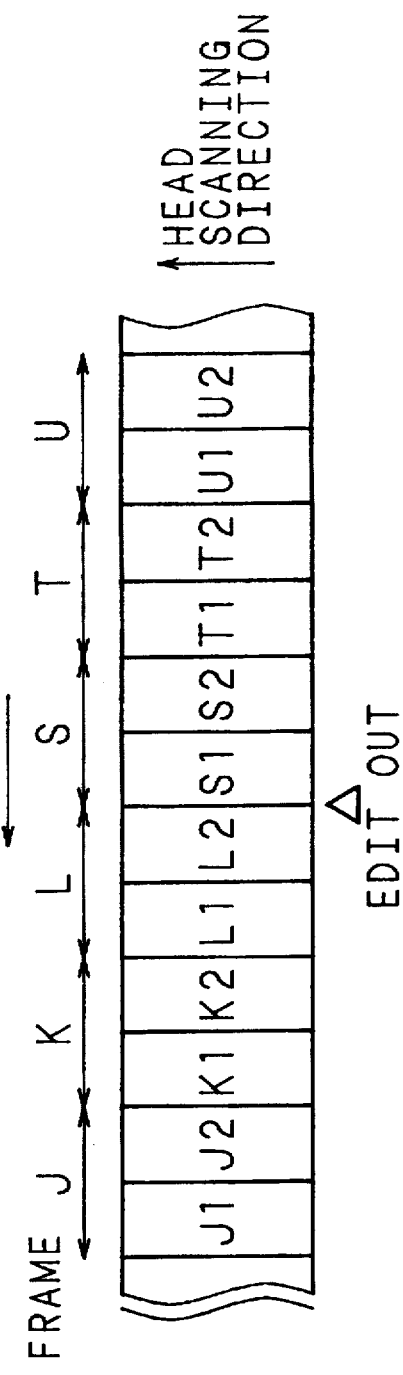
FIG. 24(b) is a diagram showing a state of the recording tracks in the vicinity of the edit OUT point in the invention.

In the foregoing embodiments 8, 9, 10, the same frame of video data is recorded both or either for the first two consecutive frame periods immediately after the edit IN point and/or for the last two consecutive frame periods immediately before the edit OUT point. However, in this embodiment, the same frame of video data is recorded repeatedly neither immediately before the edit IN point nor after the edit OUT point. FIGS. 24(a) and (b) shows states of the recording tracks in the case where the recording is carried out by the assemble editing and insert editing in the VTR of this embodiment. FIG. 24(a) shows the state in the vicinity of the edit IN point, while FIG. 24(b) shows the state in the vicinity of the edit OUT point. Here, the number of tracks corresponding to one frame of video data is two: one for a first field and the other for a second field, and numerals designated to the respective tracks are in agreement with the first and second fields constituting the respective frames.

At the edit IN point shown in FIG. 24(a), new frames A, B, C, . . . are recorded by the edit IN following the video data indicated at tracks Z1 and Z2 constituting the first and second fields corresponding to the last frame Z of the previously recorded ones immediately before the edit IN point. In FIG. 24(a), indicated at A1, A2 are tracks constituting the first and second fields corresponding to the frame A. The same can be said for the following tracks B1 and B2, C1, C2, and the like. The operations carried out during the edit IN will be described with reference to FIG. 11. When a signal is sent from the editing control terminal 100 of FIG. 11 to the encoder 2 so as to designate the start of the recording by the edit IN, the encoder 2 outputs frames of video data A, B, C, . . . input continuously in time series from the input terminal 80 after the edit IN in this order.

Figures 25A, 25B:
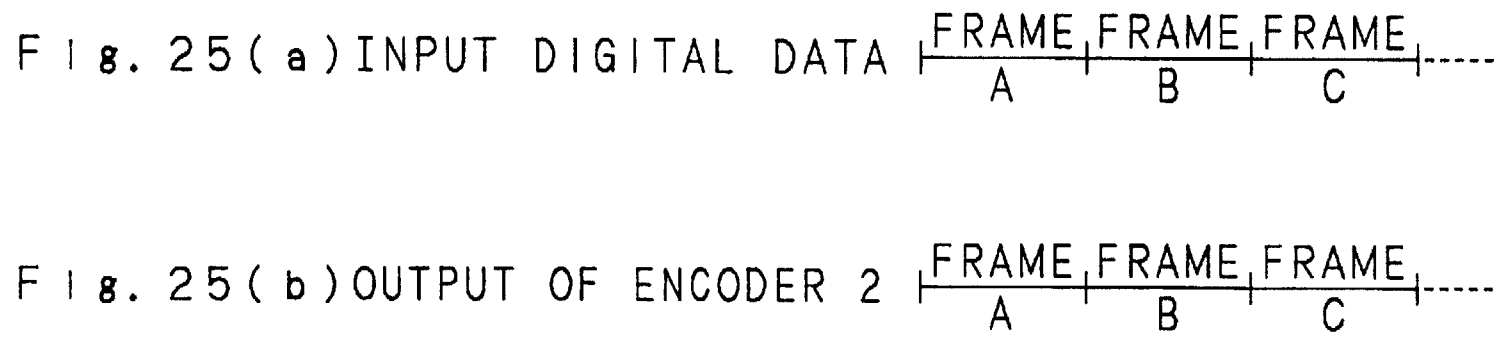

FIG. 25 shows the aforementioned video data to be recorded immediately after the edit IN point. FIG. 25(a) shows frames of digital video data A, B, C, . . . input from the input terminal 80 after the edit IN point. FIG. 25(b) shows the digital codes of the video data to be recorded which are output from the encoder 2 in the order of A, B, C, . . . by the frame. At least the digital code corresponding to the track A1 or A2 constituting the first recorded frame A immediately after the edit IN point, which is output from the encoder 2 is recorded such that the ID code for each block shown in FIG. 13 includes the start ID data indicative of the start of the recording. The digital codes output from the encoder 2 shown in FIG. 25(b) are converted into signals in the form suitable for the recording in the modulator 3, and are recorded on a magnetic tape through an unillustrated recording head.

There will be described a processing carried out in completing the recording at the edit OUT point. When a signal is sent from the editing control terminal 100 of FIG. 11 to the encoder 2 so as to designate the end of the recording at the edit OUT point, frames of digital video data . . . , J, K, L immediately before the edit OUT point which are input from the input terminal 80 are output as they are from the encoder 2 to the modulator 3, thereby completing the recording. FIG. 26(a) shows frames of input digital video data . . . J, K, L immediately before the edit OUT point from the input terminal 80. FIG. 26(b) shows the digital codes of the video data to be recorded which are output from the encoder 2 in the order of . . . . J, K, L by the frame.

At least the digital code corresponding to the track L1 or L2 constituting the last recorded frame L immediately before the edit OUT point which is output from the encoder 2 is recorded such that the ID code for each block shown in FIG. 13 includes the end ID data indicative of the end of the recording. In the recording tracks in the vicinity of the edit OUT point in FIG. 24(b), the tracks K1, K2 and the tracks L1, L2 are tracks corresponding to the first and second fields in the frame K and the last frame L immediately before the edit OUT point. In FIG. 24(b), the tracks S1, S2 are tracks corresponding to the first and second fields constituting the previously recorded frame S.

There will be described operations carried out in the reproducing operation next with reference to FIG. 11. To the decoder 12 are input the reproduced digital codes from the respective tracks obtained by demodulating digitally the reproduced signals from the magnetic head in the demodulator 13. In the decoder 12, the error detection is applied to each block of the reproduced data using the parity code added to each block in the encoder 2 in the recording operation. The error is corrected if detected any. If there is detected an error which cannot be corrected, the restoration is carried out, for example, by replacing with a data synthesized from correct pixels in the vicinity of a pixel which could not be corrected, so that the video data carrying no error is input to the memory 14. These video data are stored in the memory 14 through the writing control from the memory controller 23.

Figure 27:
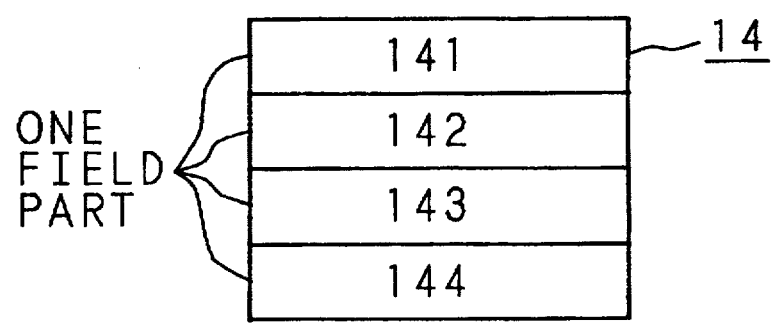
FIG. 27 is a diagram showing a construction of a memory of a reproducing system in the invention.

FIG. 27 shows an example of internal construction of the memory 14 shown in FIG. 11. For example, the memory 14 includes a total of four fields having storage areas 141 to 144 for each frame in this embodiment. FIG. 28(a) shows the fields of video data in the vicinity of the edit IN point which are written in the memory 14 in time series, and storage areas provided in the memory 14 for storing these data. In FIG. 28(a), fields . . . , Y2, Z1, Z2, A1, A2, B1, B2, . . . in the vicinity of the edit IN point which are input in time series to the memory 14 are stored in the storage areas . . . , 141, 142, 143, 144, 141, 142, 143, . . . frame by frame.

This area corresponds to recorded areas other than areas immediately before and after the edit IN point in which the data are continuously recorded. For example, the memory controller 23 sends to the memory 14 such a control signal 20 that the reproduced video data such as the fields Y2 and Z1 written in the memory 14 are read from the areas 141, 142 at a timing delayed by substantially two field periods from the writing timings thereof. The digital video data read from the memory 14 before the field Z2 immediately before the edit IN point and output to the output terminal 90 are shown as . . . , Y2, first Z1 by the frame in FIG. 28(b).

Incidentally, as described in the description of the prior art, the track thinness and the same azimuth remnant as shown in FIGS. 2(a), 2(b) generally occur in the tracks corresponding to the frame Z positioned immediately before the edit IN point, particularly the last track Z2 corresponding to the second field, or the tracks corresponding to the newly recorded frame A immediately after the edit OUT point, particularly the track A1 corresponding to the first field. Accordingly, the probability is increased that many errors occur in the reproduced digital codes from the tracks of these frames Z, A. This in turn increases greatly the frequency at which the error correction and restoration are conducted in the decoder 12. Thus, if the data corresponding to the frames Z, A are read as they are from the memory 14 in which the output data of the decoder 12 are written, the reproduced images present the deteriorated quality immediately before and after the edit In point. This phenomenon may occur more frequently if the recording tracks of the VTR are narrowed.

In view of this, upon reproduction of at least the start ID data in the ID code added to the track A1 corresponding to the first recording frame A immediately after the edit IN point during the recording operation, a detection flag F1 is output from the decoder 12 as shown in FIG. 28(c) substantially in synchronism with the writing timing of the field A1 shown in FIG. 28(a). When this detection flag F1 is input to the memory controller 23, the memory controller 23 sends a control signal 20 to the memory 14 in order to control the memory 14 in the following manner. The video data reproduced from the track Z2 constituting the second field of the last frame Z of the previously recorded ones immediately before the edit IN point which has been stored in the storage area 143 in the memory 14 is not read from the area 143. Instead, the video data reproduced from the preceding track Z1 constituting the first field of the frame Z is read from the storage 142 for another field period. Thus, the field Z1 is read for two consecutive field periods in total, if the first Z1 is included.

Further, the memory controller 23 sends to the memory 14 such a control signal 20 that the video data reproduced from the track A1 constituting the first field of the first frame A recorded immediately after the edit IN point is not read from the storage area 144 in the memory 14, but instead the video data reproduced from the succeeding track A2 constituting the second field of the frame A is read from the storage area 141 in the memory 14 for two consecutive field periods at a timing delayed by one field period from the writing timing thereof.

As described above, the video data following the field B1 stored in the area 142 in the memory 14 are read respectively from the storage area 142 and succeeding areas at timings delayed by substantially two field periods (one frame period) from the writing timings thereof. FIG. 28(b) shows fields of digital video data read from the memory 14 and output to the output terminal 90. Since the memory 14 includes the storage capacity of four fields, the writing and the reading are not carried out at an overlapping timing. FIG. 30(a) shows the aforementioned reproduced video data used in the vicinity of the edit IN point in the order of the fields.

As a result, the last frame Z of the previously recorded ones immediately before the edit IN point and the first recorded frame A immediately after the edit IN point are reproduced as the video images whose vertical resolution is reduced to the half compared to the one in the recording operation. However, in most cases, there is no correlation between the frames Z and A which are recorded at different occasions. The resolution is reduced to the half only for one frame period before and after the edit IN point. The deterioration in the quality of the video images is hardly sensed visually even if the resolution is reduced to the half in the vertical direction in one frame before and after the edit IN point.

There will be described a processing carried out in the vicinity of the edit OUT point. FIG. 29(a) shows frames of video data in the vicinity of the edit OUT point which are written in time series in the memory 14, and storage areas for storing these data. In FIG. 29(a), the fields . . . , K2, L1, L2, S1, S2, T1, T2, . . . in the vicinity of the edit OUT point which are input in time series to the memory 14 are stored field by field in the areas . . . , 141, 142, 143, 144, 141, 142, 143 . . . in the memory 14. This area corresponds to recorded areas other than areas immediately before and after the edit IN point in which the data are continuously recorded. For example, the memory controller 23 sends to the memory 14 such a control signal 20 that the reproduced video data of the fields K2 and L1 written in the memory 14 are read from the areas 141, 142 at a timing delayed by substantially two field periods from the writing timings thereof. The digital video data read from the memory 14 before the field L2 immediately before the edit OUT point and output to the output terminal 90 are shown as . . . , K2, and first L1 by the field in FIG. 29(b).

Incidentally, the track thinness and the same azimuth remnant as shown in FIGS. 2(a), 2(b) generally occur in the tracks corresponding to the frame L immediately before the edit OUT point where the recording is completed, particularly the last track L2 corresponding to the last second field, or the tracks corresponding to the previously recorded frame S immediately after the edit OUT point, particularly the track S1 corresponding to the first field. In view of this, similar to the case of the edit IN, upon reproduction of at least the end ID data in the ID code added to he track L2 corresponding to the last recording frame L immediately before the edit OUT point where the recording is completed, a detection flag F2 is output from the decoder 12 as shown in FIG. 29(c) substantially in synchronism with the writing timing of the field L2 shown in FIG. 29(a).

When this detection flag F2 is input to the memory controller 23, the memory controller 15 sends a control signal 20 to the memory 14 in order to control the memory 14 in the following manner. The video data reproduced from the track L2 constituting the second field of the last frame L where the recording is completed immediately before the edit OUT point which data has been stored in the storage area 143 in the memory 14 is not read from the area 143. Instead, the video data reproduced from the preceding track L1 constituting the first field of the frame L is read from the storage 142 for another field period. Thus, the field L1 is read for two consecutive field periods in total, if the first L1 is included.

The memory controller 23 also sends to the memory 14 such a control signal 20 that the video data reproduced from the track S1 constituting the first field corresponding to the previously recorded frame S immediately after the edit OUT point is not read from the storage area 144 in the memory 14, but instead the video data reproduced from the succeeding track S2 constituting the second field of the frame S is read from the storage area 141 in the memory 14 for two consecutive field periods at a timing delayed by substantially one field period from the writing timing thereof.

As described above, the video data following the field T1 stored in the area 142 in the memory 14 are read respectively from the storage area 142 and succeeding areas at timings delayed by substantially two field periods (one frame period) from the writing timings thereof. FIG. 29(b) shows fields of digital video data in the vicinity of the edit OUT point which are read from the memory 14 and output to the output terminal 90. Further, FIG. 30(b) shows the reproduced video data used in the vicinity of the edit OUT point in the order of the fields. The storage capacity and the control method of the memory 14 are not limited to those described above.

As a result, the last frame L immediately before the edit OUT point where the recording is completed and the previously recorded frame S immediately after the edit OUT point are reproduced as the video images whose vertical resolution is reduced to the half compared to the one in the recording operation. However, in most cases, there is no correlation between the frames L and S which are recorded at different occasions. The resolution is reduced to the half only for one frame period before and after the edit OUT point. The deterioration in the quality of the video images is hardly sensed visually even if the resolution is reduced to the half in the vertical direction in one frame before and after the edit OUT point.

EMBODIMENT 12

In the processing during the reproducing operation in the embodiment 11, the video data A2 of the second field reproduced from the track A2 located after the track A1 is substituted for the reproduced video data corresponding to the first field of the first recorded frame A immediately after the edit IN point. Further, the video data S2 of the second field reproduced from the track S2 located after the track S1 is substituted for the reproduced video data corresponding to the first field of the previously recorded frame S immediately after the edit OUT point.

Figure 31A:
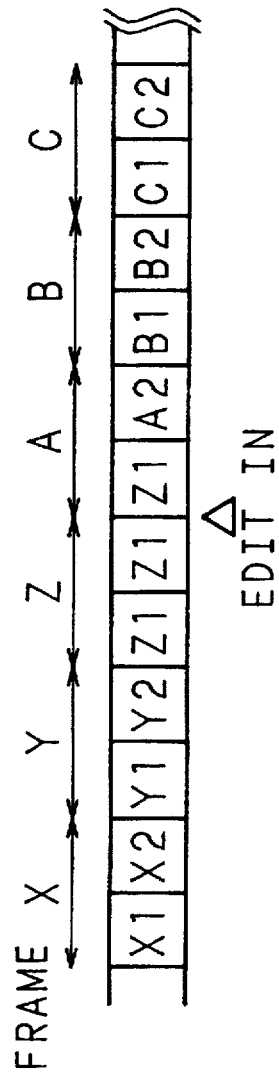
FIG. 31(a) is a diagram showing a reproduced video data in the vicinity of the edit IN point by the frame in the invention.

However, in this embodiment, the video data Z1 reproduced from the track Z1 constituting the first field of the last frame Z of the previously recorded ones immediately before the edit IN point in FIG. 24(a) is used as a data substituted for the second field of the frame Z and a data substituted for the first field of the new frame A immediately after the edit IN point in the reproducing operation. Further, the reproduced video data A2 from the track A2 constituting the second field of the originally recorded frame A is used as the video data of the second field of the frame A. FIG. 31(a) shows the reproduced video data used in the vicinity of the edit IN point in this embodiment in the order of the fields.

Figure 31B:
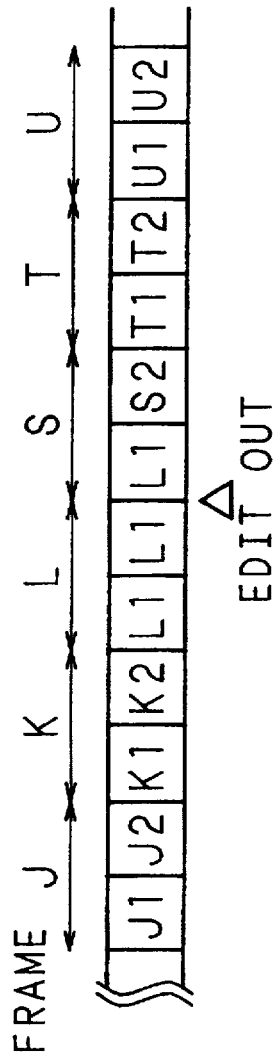
FIG. 31(b) is a diagram showing a reproduced video data in the vicinity of the edit OUT point by the frame in the invention.

In the vicinity of the edit OUT point in the reproducing operation in this embodiment, the video data L1 from the track L1 constituting the first field of the last frame L whose recording is completed at the edit OUT point is used as a data substituted for the second field of the frame L and a data substitute for the first field of the frame S positioned immediately after the edit OUT point. Further, the reproduced video data S2 from the track S2 constituting the second field of the originally recorded frame S is used as the video data of the second field of the frame S. FIG. 31(b) shows the reproduced video data used in the vicinity of the edit OUT point in this embodiment in the order of the fields.

As described above, in the vicinity of the edit IN point of the embodiment, the data A1 of the first field of the frame A is not used in the reproducing operation. However, generally, the data A2 of the second field which is greatly correlated with the first field when the frame is recorded is used as the reproduced video data. Accordingly, the contents of the first frame A newly recorded after the edit IN point can be recognized. Even if the video data Z1 of the first field of the last frame Z of the previously recorded ones immediately before the edit IN point is used as a data substituted for the first field of the frame A, there is no correction between the frames Z and A which have been recorded at different occasions. Thus, the unnaturalness is not sensed visually even if the first and second fields of the reproduced frame A consist of the tracks Z1 and A2 respectively. Further, the video data of the track Z1 is used as the reproduced video data of the first and second fields of the last frame Z of the previously recorded ones immediately before the edit IN point. Thus, although the vertical resolution is reduced to the half compared to the one in the recording operation, the deterioration in the image quality is hardly sensed visually since the same field of video data is recorded only for one frame period. The same can be said to the regions before and after the edit OUT point shown in FIG. 31(b).

In the embodiment 12, the similar effects are obtainable when, for example, the field of video data in the frame after the edit IN including the second field A2 of the first frame A newly recorded immediately after the edit IN is used as the reproduced video data substituted for the second field Z2 of the last frame Z previously recorded immediately before the edit IN point shown in FIG. 24(a). At this time, the video data of the second field A2 of the first frame A newly recorded immediately after the edit IN is also used as the reproduced video data substituted for the first field A1 of the first frame A newly recorded immediately after the edit IN.

Likewise, the effects similar to the above are obtainable when, for example, the field of video data in the frame after the edit OUT including the second field S2 of the first frame S previously recorded immediately after the edit OUT is used as the reproduced video data substituted for the second field L2 of the last frame L whose recording is completed immediately before the edit OUT point shown in FIG. 24(b). At this time, the video data of the second field S2 of the first frame S previously recorded immediately after the edit OUT is also used as the reproduced video data substituted for the second field L2 of the last frame L whose recording is completed immediately before the edit OUT.

In the foregoing embodiments 11, 12, the number of tracks for each field is not limited to one as shown in FIG. 24, but may be a plural number. Further, the field corresponding to the last track in a plurality of tracks constituting one frame is not necessarily limited to the second field as shown in FIG. 24. The tape may be so formatted that the first field corresponds to the last one of the tracks constituting one frame.

The foregoing embodiments 8 to 12 are described with respect to the digital VTR whose construction is a recording/reproducing system as shown in FIG. 11. However, the digital VTR may have the construction as shown in FIG. 32. The construction of FIG. 11 is different from that of FIG. 32 in the following point. In FIG. 32, a high efficiency encoding unit 51 is provided in a recording system. The digital video data input through the input terminal 80 has a recording data rate reduced in the high-efficiency encoding unit 51, and is recorded as described in the embodiments 8 to 12. On the contrary, a high-efficiency decoding unit 61 is provided in a reproducing system in which the reproducing operation described in the embodiments 8 to 12 is carried out. The digital video data is restored into the form input to the input terminal 80 in the recording operation using the high-efficiency decoding unit 61, and is output to the output terminal 90. With the construction shown in FIG. 32, the storage capacity of the memory 14 or the memory included in the encoder 2 is allowed to be smaller than the one in FIG. 11 while the effects similar to the embodiments 8 to 12 can be obtained. Various methods can be adopted as a high efficiency encoding method, including the transform encoding such as a discrete cosine transform (DCT).

Although the foregoing embodiments 8 to 12 are described with respect to the digital VTR, the invention can be applied to VTRs of the analog recording system.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method of seaming first and second video data segments recorded onto a linearly displaceable video recording medium, said first and second video data segments each including at least one video data portion having a pair of video data portion edges, said method comprising:
   a) dividing each video data portion into low frequency and high frequency data portions; and
   b) storing each said video data portion on a plurality of consecutive tracks including a pair of edge tracks on the linearly displacement video recording medium while storing only said high frequency data portion on at least one edge track, said step b) including,
      i) recording said first video data segment on said linearly displaceable video recording medium, and
      ii) recording said second video data segment on said linearly displaceable video recording medium with the edges of said video data portions of said second video data segment being in substantial alignment with the edges of said video data portions of said first video data segment at a seam between said first and second video data segments;
   conditions caused by slight misalignment of the edges of said video portions of said first and second video data segments in said step b)ii) causing loss of at most said high frequency data portion located on an edge track immediately adjacent said seam, thereby losing only high frequency video information in the video portions immediately adjacent the seam.

2. The method of claim 1 wherein the method of seaming includes forming seams by insert and assembly editing.

3. The method of claim 1 wherein each video data portion is a video frame or field.

4. The method of claim 1 wherein said video recording medium is a video tape.

5. The method of claim 1 wherein said step b) stores said high frequency data portions on both of said pair of edge tracks.

6. The method of claim 1 wherein said step a) includes transform coding each video data portion to produce said low and high frequency data portions.

7. The method of claim 6 wherein said transform coding is discrete cosine transform coding.

8. The method of claim 1 wherein said conditions caused by slight misalignment of the edges of said video portions include track thinness and same azimuth remnant.

9. The method of claim 1 wherein each video data portion is a video frame including a pair of video fields, a portion of said high frequency data portions associated with each video field being stored on each of said edge tracks.

10. The method of claim 1 further comprising,
   c) encoding each divided video data portion with a parity check scheme prior to said step b).

11. During recording and reproducing and reproducing, a method of seaming first and second video data segments onto and from a linearly displaceable video recording medium, said first and second video data segments each including at least one video data portion having a pair of video data portion edges, said method comprising:
   a) driving each video data portion into low frequency and high frequency data portions; and
   b) storing each divided video data portion on a plurality of consecutive tracks including a pair of edge tracks on the linearly displaceable video recording medium while storing only said high frequency data portions on at least one edge track, said step b) including,
      i) recording said first video data segment on said linearly displaceable video recording medium, and
      ii) recording said second video data segment on said linearly displaceable video recording medium with the edges of said video data portions of said video second data segment being in substantial alignment with the edges of said video data portions of said first video data segment at a seam between said first and second video data segments;
   conditions caused by slight misalignment of the edges of said video portions of said first and second video data segments in said step b)ii) causing loss of at most said high frequency data portion located on an edge track immediately adjacent said seam, thereby losing only high frequency video information in the video portions immediately adjacent the seam;
   c) reproducing the high frequency and low frequency data portions of said video data portions stored in said step b);
   d) determining a number of errors in each high frequency data portion containing edge track reproduced in said step c);
   e) deleting the high frequency data portion stored in a said edge track where said number of errors determined by said step d) exceeds a threshold value; and
   f) combining the low frequency data portion and any high frequency data portion of each said video data portion to recover the stored first and second video data segments.

12. The method of claim 11 wherein the method of seaming includes forming seams by insert and assembly editing.

13. The method of claim 11 wherein each video data portion is a video frame or field.

14. The method of claim 11 wherein said video recording medium is a video tape.

15. The method of claim 11 wherein said step b) stores said high frequency data portions on both of said pair of edge tracks.

16. The method of claim 11 wherein said step a) includes transform coding each video data portion to produce said low and high frequency data portions.

17. The method of claim 16 wherein said transform coding is discrete cosine transform coding.

18. The method of claim 11 wherein said conditions caused by slight misalignment of the edges of said video portions include track thinness and same azimuth remnant.

19. The method of claim 11 wherein each video data portion is a video frame including a pair of video fields, a portion of said high frequency data portions associated with each video field being stored on each of said edge tracks.

20. The method of claim 11 further comprising,
   c) encoding each divided video data portion with a parity check scheme prior to said step b);

said step d) determining the number of errors through use of said parity check scheme.

21. An apparatus for seaming first and second video data segments during recording onto a linearly displaceable video recording medium, said first and second video data segments each including at least one video data portion having a pair of video data portion edges, said apparatus comprising:

a data divider dividing each video data portion into low frequency and high frequency data portions; and modulator means, responsive to output of said data divider, for storing each divided video data portion on a plurality of consecutive tracks including a pair of edge tracks on the linearly displaceable video recording medium while storing only said high frequency data portions on at least one edge track;

said modulator means recording said first video data segment on said linearly displaceable video recording medium, recording said second video data segment on said linearly displaceable video recording medium with the edges of said video data portions of said second video data segment being in substantial alignment with the edges of said video data portions of said first video data segment at a seam between said first and second video data segments;

conditions caused by slight misalignment of the edges of said video data portions of said first and second video data segments stored by said modulator means causing loss of at most said high frequency data portion located on an edge track immediately adjacent said seam, thereby losing only high frequency video information in the video portions immediately adjacent the seam.

22. The apparatus of claim 21 wherein the apparatus for seaming forms seams by insert and assembly editing.

23. The apparatus of claim 21 wherein each video data portion is a video frame or field.

24. The apparatus of claim 21 wherein said video recording medium is a video tape.

25. The apparatus of claim 21 wherein said modulator means stores said high frequency data portions on both of said pair of edge tracks.

26. The apparatus of claim 21 wherein said data divider transform codes each video data portion to produce said low and high frequency data portions.

27. The apparatus of claim 21 wherein said conditions caused by slight misalignment of the edges of said video portions include track thinness and same azimuth remnant.

28. The apparatus of claim 21 wherein each video data portion is a video frame including a pair of video fields, said modulator means storing a portion of said high frequency data portions associated with each video field on each of said edge tracks.

29. A recording and reproducing apparatus which seams first and second video data segments during recordation onto and reproduction from a linearly displaceable video recording medium, said first and second video data segments each including at least one video data portion having a pair of video data portion edges, said apparatus comprising:

a data divider dividing each video data portion into low frequency and high frequency data portions; and modulator means, responsive to output of said data divider, for storing each divided video data portion on a plurality of consecutive tracks including a pair of edge tracks on the linearly displaceable video recording medium while storing only said high frequency data portions on at least one edge track;

said modulator means recording said first video data segment on said linearly displaceable video recording medium, recording said second video data segment on said linearly displaceable video recording medium with the edges of said video data portions of said second video data segment being in substantial alignment with the edges of said video data portions of said first video data segment at a seam between said first and second video data segments;

conditions caused by slight misalignment of the edges of said video data portions of said first and second video data segments when recorded by said modulator means causing loss of at most said high frequency data portions located on an edge track immediately adjacent said seam, thereby losing only high frequency video information in video portions immediately adjacent the seam;

demodulator means for reproducing the high frequency and low frequency data portions of said video data portions stored in said memory medium;

an error counter determining a number of errors in each high frequency data portion containing edge track reproduced by said demodulator means;

means, responsive to said error counter, for deleting the high frequency data portions stored in a said edge track where said number of errors determined by said error counter exceeds a threshold value; and means for combining the low frequency data portions any high frequency data portions of each said video data portion to recover the stored first and second video data segments.

30. The apparatus of claim 29 wherein the apparatus for seaming forms seams by insert and assembly editing.

31. The apparatus of claim 29 wherein each video data portion is a video frame or field.

32. The apparatus of claim 29 wherein said video recording medium is a video tape.

33. The apparatus of claim 29 wherein said modulator means stores said high frequency data portions on both of said pair of edge tracks.

34. The apparatus of claim 29 wherein said data divider transform codes each video data portion to produce said low and high frequency data portions.

35. The apparatus of claim 29 wherein said conditions caused by slight misalignment of the edges of said video portions include track thinness and same azimuth remnant.

36. The apparatus of claim 29 wherein each video data portion is a video frame including a pair of video fields, said modulator means storing a portion of said high frequency data portions associated with each video field on each of said edge tracks.

37. The apparatus of claim 29 further comprising, an encoder encoding each divided video data portion with a parity check scheme prior to storing by said modulator means;

said error counter determining said number of errors through use of said parity check scheme.

* * * * *